ns011719780B2

United States Patent
Pados et al.

(10) Patent No.: US 11,719,780 B2
(45) Date of Patent: Aug. 8, 2023

(54) METHOD AND APPARATUS FOR ROBUST LOW-COST VARIABLE-PRECISION SELF-LOCALIZATION WITH MULTI-ELEMENT RECEIVERS IN GPS-DENIED ENVIRONMENTS

(71) Applicant: FLORIDA ATLANTIC UNIVERSITY RESEARCH CORPORATION, Boca Raton, FL (US)

(72) Inventors: Dimitris A. Pados, Boca Raton, FL (US); Konstantinos Tountas, Boca Raton, FL (US); Georgios Sklivanitis, Boca Raton, FL (US)

(73) Assignee: FLORIDA ATLANTIC UNIVERSITY RESEARCH CORPORATION, Boca Raton, FL (US)

( * ) Notice: Subject to any disclaimer, the term of this patent is extended or adjusted under 35 U.S.C. 154(b) by 0 days.

(21) Appl. No.: 17/622,584

(22) PCT Filed: Aug. 28, 2020

(86) PCT No.: PCT/US2020/048525
§ 371 (c)(1),
(2) Date: Dec. 23, 2021

(87) PCT Pub. No.: WO2021/101613
PCT Pub. Date: May 27, 2021

(65) Prior Publication Data
US 2022/0260663 A1    Aug. 18, 2022

Related U.S. Application Data

(60) Provisional application No. 62/926,843, filed on Oct. 28, 2019.

(51) Int. Cl.
*G01S 1/74* (2006.01)
*G01S 3/801* (2006.01)
(Continued)

(52) U.S. Cl.
CPC .............. *G01S 1/753* (2019.08); *G01S 3/801* (2013.01); *G01S 3/8022* (2013.01); *G01S 5/24* (2013.01);
(Continued)

(58) Field of Classification Search
CPC ........ G01S 1/753; G01S 3/801; G01S 3/8022; G01S 5/24; G01S 15/582; G01S 15/60;
(Continued)

(56) References Cited

U.S. PATENT DOCUMENTS

2008/0008045 A1    1/2008  Basilico
2008/0037370 A1    2/2008  Crowell
(Continued)

FOREIGN PATENT DOCUMENTS

WO    WO-2021101613 A1 *  5/2021  ............. G01S 1/753

OTHER PUBLICATIONS

International Search Report for corresponding PCT Application No. PCT/US2020/048525 dated May 4, 2021.
(Continued)

*Primary Examiner* — Daniel Pihulic
(74) *Attorney, Agent, or Firm* — Meunier Carlin & Curfman LLC

(57) ABSTRACT

A practically implementable robust direction-of-arrival (DoA) estimation approach that is resistant to localization errors due to mobility, multipath reflections, impulsive noise, and multiple-access interference. As part of the disclosed invention the inventors consider infrastructure-less 3D localization of autonomous underwater vehicles (AUVs) with no GPS assistance and no availability of global clock synchronization. The proposed method can be extended to challenging communication environments and applied for the localization of assets/objects in space, underground, intrabody, underwater and other complex, challenging, con-
(Continued)

gested and sometimes contested environments. Each AUV leverages known-location beacon signals to self-localize and can simultaneously report its sensor data and measurement location. The approach uses two known location beacon nodes, where the beacons are single-hydrophone acoustic nodes that are deployed at known locations and transmit time-domain coded signals in a spread-spectrum fashion.

20 Claims, 12 Drawing Sheets

(51) Int. Cl.
    *G01S 3/802* (2006.01)
    *G01S 5/24* (2006.01)
    *G01S 15/58* (2006.01)
    *G01S 15/60* (2006.01)

(52) U.S. Cl.
    CPC ............ *G01S 15/582* (2013.01); *G01S 15/60* (2013.01); *G01S 2201/07* (2019.08); *G01S 2205/04* (2020.05)

(58) Field of Classification Search
    CPC . G01S 2201/07; G01S 2205/04; G01S 3/8006
    See application file for complete search history.

(56) References Cited

U.S. PATENT DOCUMENTS

| | | |
|---|---|---|
| 2013/0208768 A1 | 8/2013 | Song et al. |
| 2014/0126334 A1 | 5/2014 | Megdal et al. |
| 2019/0204430 A1 | 7/2019 | Schmidt et al. |
| 2022/0260663 A1* | 8/2022 | Pados .................. G01S 15/60 |

OTHER PUBLICATIONS

An et al., "Coastal Oceanography Using a Small AUV", Journal of Atmospheric and Oceanic Technology, vol. 18, No. 2, pp. 215-234 (2001).
Demarco et al., "An Implementation of ROS on the Yellowfin Autonomous Underwater Vehicle (AUV)", Oceans'11 MTS/IEEE Kona, pp. 1-7 (2011).
Abstract of Lucieer et al., "Emerging Mapping Techniques for Autonomous Underwater Vehicles (AUVs)", Springer International Publishing, pp. 53-67 (2016).
Diercks et al., "Site Reconnaissance Surveys for Oil Spill Research Using Deep-Sea AUVs", 2013 Oceans, pp. 1-5 (2013).
Demirors et al., "Software-Defined Underwater Acoustic Networks: Toward a High-Rate Real-Time Reconfigurable Modem," IEEE Communications Magazine, vol. 53, No. 11, pp. 64-71 (2015).
Donovan, G. T., "Position Error Correction for an Autonomous Underwater Vehicle Inertial Navigation System (INS) Using a Particle Filter", IEEE Journal of Oceanic Engineering, vol. 37, No. 3, pp. 431-445 (2012).
Ribas et al., "Underwater SLAM in Man-Made Sstructured Environments", Journal of Field Robotics, vol. 25, pp. 898-921 (2008).
Thomson et al., "AUV Localization in an Underwater Acoustic Positioning System", 2013 MTS/IEEE Oceans—Bergen (2013).
Kaune et al., "Accuracy Analysis for TDOA Localization in Sensor Networks", 14th International Conference on Information Fusion (2011).
Moreno-Salinas et al., "Optimal Sensor Placement for Acoustic Underwater Target Positioning With Range-Only Measurements", IEEE Journal of Oceanic Engineering, vol. 41, No. 3 (2016).
Villacrosa et al., "Active Range-Only Beacon Localization for AUV Homing", 2014 IEEE/RSJ International Conference on Intelligent Robots and Systems (2014).
Masmitja et al., "Optimal Path Shape for Range-Only Underwater Target Localization Using a Wave Glider", The International Journal of Robotics Research, vol. 37, No. 12, pp. 1447-1462 (2018). 2018.
Barkby et al., "An Efficient Approach to Bathymetric SLAM", 2009 IEEE/RSJ International Conference on Intelligent Robots and Systems, pp. 219-224 (2009).
Huang et al., "An Autonomous Navigation Algorithm for Underwater Vehicles Based on Inertial Measurement Units and Sonar", 2010 2nd International Asia Conference on Informatics in Control, Automation and Robotics, vol. 1 (2010).
Demim et al., "SLAM Problem for Autonomous Underwater Vehicle Using SVSF Filter", 25th International Conference on Systems, Signals and Image Processing (IWSSIP), pp. 1-5 (2018).
Tsagkarakis et al., "Direction Finding By Complex L1-Principal-Component Analysis", 2015 IEEE 16th International Workshop on Signal Processing Advances in Wireless Communications (SPAWC) pp. 475-479 (2015).
Zhong et al., "Direction of Arrival Tracking of an Underwater Acoustic Source Using Particle Filtering: Real Data Experiments", IEEE 2013 Tencon—Spring (2013).
Tsagkarakis et al., "L1-Norm Principal-Component Analysis of Complex Data," IEEE Transactions on Signal Processing, vol. 66, No. 12, pp. 3256-3267 (2018).
Gupta et al., "Acoustic Channel Modeling and Simulation for Underwater Acoustic Wireless Sensing Networks", International Journal of Computer Applications, vol. 147, No. 7 (2016).
Urick, R.J., "Principles of Underwater Sound", 3rd Edition, Peninsula Publishing, Preface (1983).
Springer Handbook of Ocean Engineering, "Acoustic Communication," Chapter 15, Springer 2016, Preface.
Sidiropoulos et al., "Tensor Decomposition for Signal Processing and Machine Learning", IEEE Transactions on Signal Processing, vol. 65, No. 13 (2017).
Kolda et al., "Tensor Decompositions and Applications", SIAM Review, vol. 51, No. 3, pp. 455-500 (2009).
Sun et al., "Incremental Tensor Analysis: Theory and Applications," ACM Transactions on Knowledge Discovery from Data, vol. 2, No. 3, pp. 1-37 (2008).
Li et al., "MR-NTD: Manifold Regularization Nonnegative Tucker Decomposition for Tensor Data Dimension Reduction and Representation," IEEE Transactions on Neural Networks and Learning Systems, vol. 28, No. 8, pp. 1787-1800 (2017).
Tountas et al., "Conformity Evaluation and L1-Norm Principal-Component Analysis of tensor Data", Proc. SPIE Big Data: Learning, Analytics, and Applications (2019).
Markopoulos et al., "The Exact Solution to Rank-1 L1-Norm TUCKER2 Decomposition," IEEE Signal Processing Letters, vol. 25, No. 4, pp. 511-515 (2018).
Qarabaqi et al., "Statistical Characterization and Computationally Efficient Modeling of a Class of Underwater Acoustic Communication Channels," IEEE Journal of Oceanic Engineering, vol. 38, No. 4, pp. 701-717 (2013).
Tountas et al., "Beacon-Assisted Underwater Localization by L1-norm Space-Time Tensor Subspaces", Oceans 2019 MTS/IEEE, pp. 1-6 (2019).

\* cited by examiner

METHOD AND APPARATUS FOR ROBUST LOW-COST VARIABLE-PRECISION SELF-LOCALIZATION WITH MULTI-ELEMENT RECEIVERS IN GPS-DENIED ENVIRONMENTS

CROSS-REFERENCE TO RELATED APPLICATIONS

This application is a U.S. National Phase Application under 35 U.S.C. § 371 of PCT/US2020/048525, filed Aug. 28, 2020, which claims priority to U.S. Provisional Application No. 62/926,843, filed Oct. 28, 2019, the contents of which are incorporated herein by reference in their entireties.

STATEMENT REGARDING FEDERALLY SPONSORED RESEARCH OR DEVELOPMENT

This invention(s) was made with government support under grant number CNS-1753406 awarded by the National Science Foundation. The government has certain rights in the invention(s).

FIELD OF DISCLOSURE

The disclosure relates to wireless communication and self-localization in challenging GPS-denied environments with limited power, computation and communication resources. In particular, the disclosure relates to underwater GPS and indoor GPS for human/robot localization and tracking.

BACKGROUND

Increasingly, robots not only soar through the air and wander over the land but they also swim on and under the water. Nowadays, unmanned vehicles in the air and on land regularly communicate using radio waves, including satellite, cellular and Wi-Fi signals. However, radio waves generally do not penetrate deeply through water. As a result, functionalities that are easily realized with unmanned aerial or ground vehicles, such as remote control via radio signals or navigation via GPS, are far more difficult to accomplish underwater.

Instead of relying on radio waves, sound waves are the preferred option for underwater wireless communications. Sound can easily travel over kilometers, or even hundreds of kilometers, but to cover a longer distance, a lower frequency must be used. Underwater acoustic communication channels have limited bandwidth that is very low compared to those used for terrestrial radio communications and often cause signal dispersion in time and frequency. In addition to frequency and time-dependent attenuation, underwater acoustic transmissions are severely affected by time-varying multipath propagation (due to bottom/surface signal reflections), high and variable spatio-temporal propagation delay, and Doppler spread.

Fundamental to the success of underwater communications is robust localization and tracking to support position-aware data routing and autonomous vehicle navigation in the GPS-less underwater environment. GPS-free localization schemes proposed for terrestrial radio networks involve intensive message exchanges, and therefore are not suitable for low-bandwidth, high latency underwater acoustic channels. As a result, existing state-of-the-art approaches for underwater localization consider expensive, power-intense inertial measurement sensors, geophysical-based imaging, and acoustic signaling techniques. Acoustic-based localization techniques rely on angle or distance measurements between wirelessly communicating nodes that are collected by Received-Signal-Strength (RSS), Time-of-Arrival (ToA), Time-of-Flight (ToF), Time-Difference-of-Arrival (TDoA), and Angle-of-Arrival (AoA) techniques. Multipath propagation and long delays, especially in shallow waters, result in significant errors and outliers in acoustic and imaging measurements.

SUMMARY

The following presents a simplified summary in order to provide a basic understanding of some aspects of one or more embodiments or examples of the present invention. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

Exemplary concepts relate to underwater GPS and indoor GPS for human/robot localization and tracking to pursue a paradigm shift in how signal Direction-of-Arrival (DoA) estimation is carried out over wireless communication links, and further to beacon-assisted localization by $L_1$-norm space-time tensor subspaces in Doppler and multipath fading noisy environments. The concepts can be extended to challenging communication environments and applied for the localization of assets/objects in space, underground, intrabody, underwater and other complex, challenging, congested and sometimes contested environments.

Examples demonstrate a beacon-assisted underwater localization system that can be utilized for 3D self-localization of Autonomous Underwater Vehicles (AUVs). Robust DoA-guided localization of the AUVs is achieved, for example, by iteratively refined $L_1$-norm space-time tensor subspaces. The exemplary localization systems leverage the tensor structure of space-time coded reference beacon signals at the input of a triangular hydrophone array (that will be mounted on the AUV) to jointly estimate the angles-of-arrival of the beacons, as well as, identify the codes corresponding to each beacon. Simulation studies verify the superiority of the exemplary localization technique compared to state-of-the-art $L_2$-norm based tensor and matrix DoA estimation methods.

The foregoing and/or other aspects and utilities embodied in the present disclosure may be achieved by providing a direction-of-arrival estimation method of an object submerged underwater, with the object having sensor data and measurements from two locations. The exemplary method includes collecting data snapshots over time at an acoustic array receiver attached to the object underwater from beacon signals transmitted from two known location beacons, organizing the collected data snapshots in a tensor data structure, conducting joint space-time signal processing, and estimating azimuth and elevation angles-of-arrival of the transmitted beacon signals via Doppler-, multipath-, and impulsive noise-resistant tensor subspaces.

According to aspects described herein, an exemplary location system is provided for direction-of-arrival estimation of an object submerged underwater, with the object having sensor data and measurements from two locations. The location system includes an acoustic array receiver and a processor. The acoustic array receiver is attached to the object underwater and configured for collecting sound wave data snapshots over time from beacon signals transmitted from two known location beacons. The processor is in communication with the acoustic array receiver and is configured to organize the collected sound wave data snapshots in a tensor data structure, conduct joint space-time signal processing, and estimate azimuth and elevation angles-of-arrival of the transmitted beacon signals via Doppler-, multipath-, and impulsive noise-resistant tensor subspaces.

According to aspects illustrated herein, an exemplary location estimation method of a first beacon is described. The method includes collecting data snapshots over time at an acoustic array receiver attached to an object underwater from beacon signals transmitted from the first beacon and a second beacon, organizing the collected data snapshots in matrix form having rows and columns, conducting joint space-time signal processing, estimating azimuth angles-of-arrival of the transmitted beacon signals via Doppler-, multipath-, and impulsive noise-resistant tensor subspaces, and estimating the location of the first beacon based on the estimated azimuth angle-of-arrival of the transmitted beacon signals.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
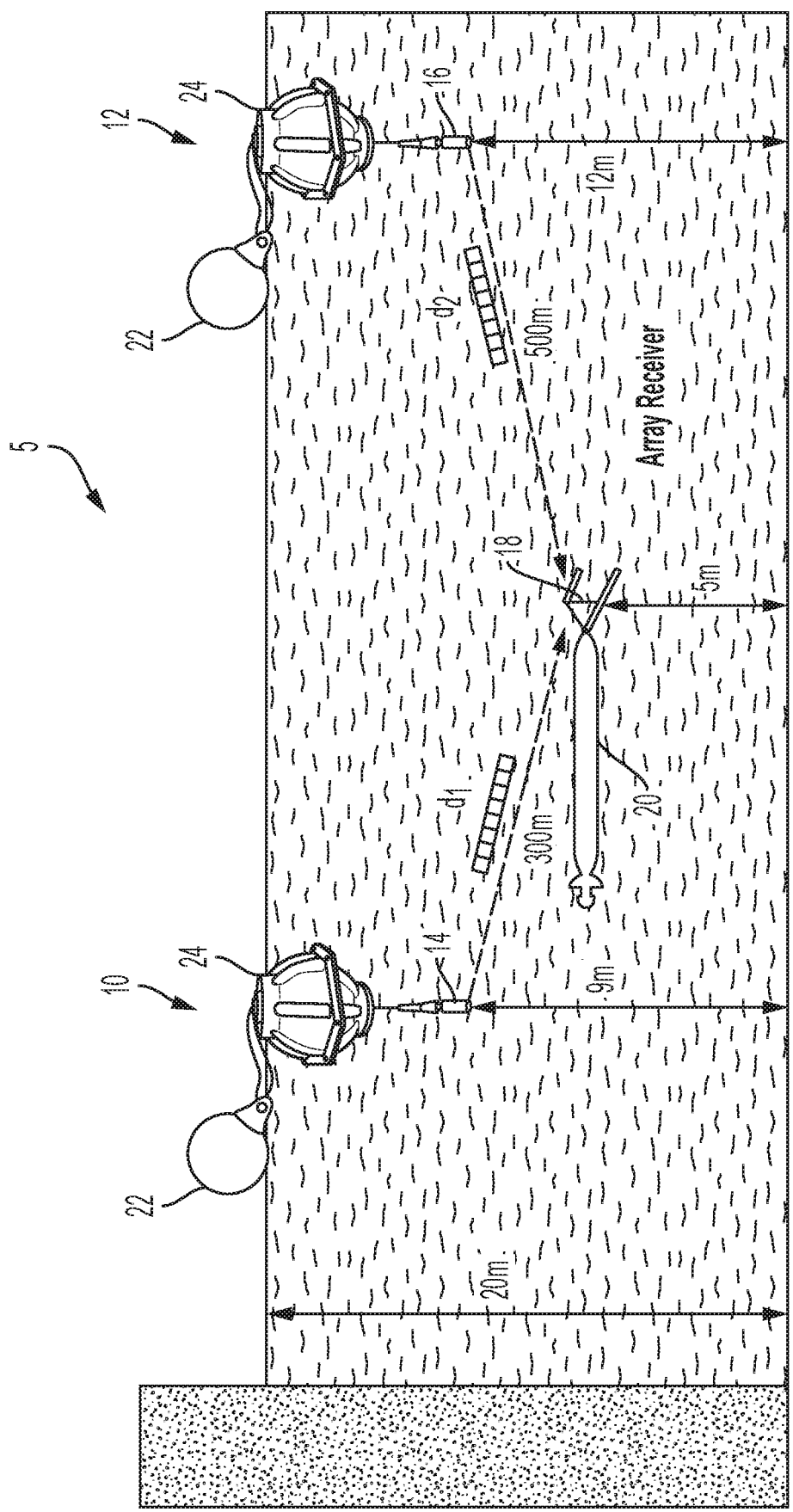
FIG. 1 illustrates an exemplary system setup of single-hydrophone underwater acoustic beacons and a triangular hydrophone acoustic array receiver in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

The inventors initially point out that description of well-known starting materials, processing techniques, components, equipment and other well-known details may merely be summarized or are omitted so as not to unnecessarily obscure the details of the present disclosure. Thus, where details are otherwise well known, the inventors leave it to the application of the present disclosure to suggest or dictate choices relating to those details. The drawings depict various examples related to embodiments of illustrative methods, apparatus, and systems for inking from an inking member to the reimageable surface.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

Autonomous Underwater Vehicles (AUVs) have attracted considerable attention for military, scientific and industrial applications including deep-sea oceanographic exploration, scientific sampling, subsea search-and-rescue, reconnaissance operations, pollution monitoring and aqua-farming. An important challenge in the deployment of AUVs is self-localization of the underwater vehicle that cannot access GPS satellite links. Self-localization of AUVs relatively to known location GPS-assisted surface buoys or other vehicles in swarm deployment can help the vehicle navigate in the unknown deep-sea environment, reliably communicate and network with other vehicles and stamp collected sensor data with a spatial reference. GPS-free localization schemes proposed for terrestrial radio networks involve intensive message exchanges, and therefore are not suitable for the low-bandwidth, high-latency underwater acoustic (UW-A) channel.

Existing state-of-the-art approaches for undersea localization and tracking of AUVs either consider expensive inertial sensors, geophysical-based, or acoustic communication techniques. Acoustic-based localization techniques rely on angle or distance measurements between wirelessly communicating nodes that are collected by received-signal-strength (RSS), Time-of-Arrival (ToA), Time-of-Flight (ToF), Time-Difference-Of-Arrival (TDoA), and Angle-of-Arrival (AoA) techniques. For example, Long Base-Line (LBL) and Ultra-Short Base-Line (USBL) involve acoustic transponders that are used as reference nodes for underwater localization and navigation. Both LBL and USBL employ TDoA techniques between time-synchronized transponders [9].

Localization costs incurred by the complex deployment and clock synchronization requirements of distributed transponders are addressed by a range-only single-beacon (ROSB) method. The ROSB method is based on tracking underwater targets/assets by controlling the maneuvers of an underwater vehicle. The vehicle periodically performs slant range measurements using the ToF of messages exchanged with underwater targets/assets. The above localization techniques offer good accuracy under nominal operation conditions. However, their performance significantly degrades in the presence of outlier measurements due to intermittent environmental disturbances, and hardware and/or channel impairments (such as channel path variations, impulsive noise sources, and faulty measurements).

Sonar-based localization techniques utilize seabed images generated from measuring the intensity of sonar reflected signals. Features extracted from these images are then used for data association in Simultaneous-Localization-And-Mapping (SLAM) methods. Most SLAM-based techniques rely on filtering algorithms such as Extended Kalman Filtering (EKF) and Particle Filtering (PF) to address linearization errors and reduce computational cost. A smooth variable structure filter method may be introduced to solve the SLAM problem. The exemplary methods are robust to modeling errors and uncertainties by utilizing existing subspace information and a smoothing layer to keep the location estimates bounded within a region of the true state trajectory.

Direction-of-Arrival (DoA)-guided localization methods typically use subspace-based parameter estimation techniques based on $L_2$-norm or $L_1$-norm Principal-Component Analysis (PCA). A particle filter may be used for DoA estimation of an acoustic source. Existing approaches for subspace-based parameter estimation rely on organization of the collected data snapshots at the receiver array in matrices by a stacking operation. Matrix representation clearly does not account for the grid structure that is inherent in the wireless channel data recordings.

Embodiments discussed in this application include a practically implementable Direction-of-Arrival (DoA) estimation approach that is resistant to localization errors due to mobility, multipath reflections, impulsive noise, and multiple-access interference. In particular, the examples determine infrastructure-less 3D localization of Autonomous Underwater Vehicles (AUVs) with no GPS assistance and no availability of global clock synchronization. Each AUV leverages known-location beacon signals to self-localize and can simultaneously report its sensor data and measurement location. The inventors utilize two known location beacon nodes, also referred to herein as beacons. The beacons are single-hydrophone acoustic nodes that are deployed in known locations and transmit time-domain coded signals in a spread-spectrum fashion.

Figure 22:
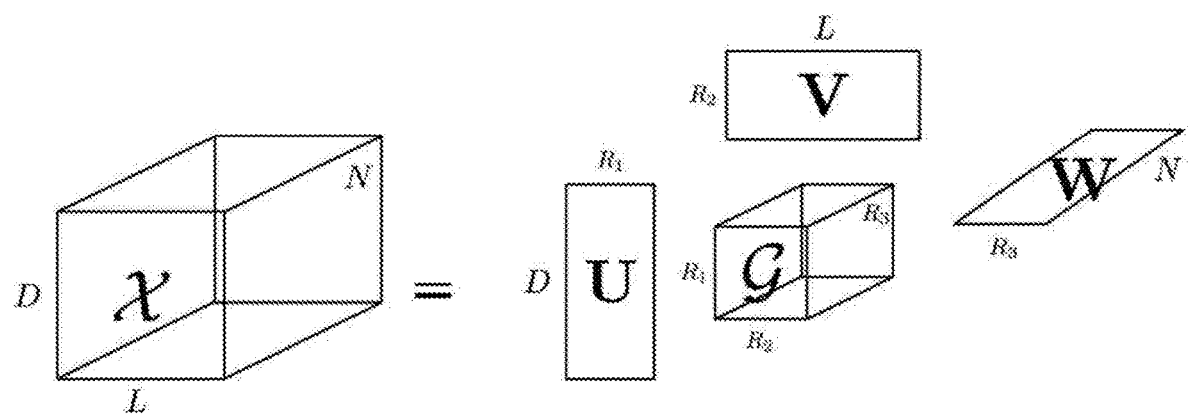
FIG. 22 illustrates an exemplary tensor data structure for organization of N data snapshots over time from L-coded beacons at an array receiver with D elements.

Beacon signals may be jointly space-time filtered at a three-element triangular acoustic array receiver that may be mounted to each AUV. The space-time coded reference beacon signals have code length that can be digitally tuned at the beacons to control the precision and accuracy (to the cm-level) of an exemplary localization algorithm at the AUV. The exemplary system allows by design, variable precision and accuracy in positioning by introducing an additional dimension (e.g., code dimension) in the search for the azimuth and elevation angles-of-arrival of a single-element beacon signal at a multi-element receiver. Increasing the code length in the two acoustic beacons may affect the precision of the exemplary localization method, as will be discussed in greater detail below. Collected data snapshots over time at a respective acoustic array receiver may be organized in a tensor data structure. FIG. 22 depicts an exemplary three-way tensor data structure.

Estimating the azimuth and elevation angles-of-arrival of the transmitted beacon signals via tensor subspace methods may involve performing principal-component analysis (PCA) for finding the $L_2$-norm space-time principal vector tensor subspace of the recorded signal snapshots. In practice, recorded signal snapshots may be sporadically corrupted by faulty measurements, impulsive noise, and/or intermittent interference due to multipath reflections and/or intentional jamming. In such cases, $L_2$-norm tensor PCA methods suffer from significant performance degradation.

Motivated by the resistance of novel $L_1$-norm-derived subspaces against the impact of irregular, high deviating points in reduced-dimensionality data approximations, the examples may apply iterative refined $L_1$-norm (absolute error) space-time tensor subspaces that are calculated at the acoustic array receiver to build an outlier- Doppler- and multipath-resistant estimation algorithm of the azimuth and elevation angles-of-arrival and codes of the two beacons. The relative position of the vehicle with respect to the two beacons is estimated via signal angle-of-arrival estimation.

Self-positioning and automated neighbor discovery of peer AUVs in multi-vehicle missions will support position-aware/geographic data routing, directional communication links and cooperative vehicle navigation in GPS-less environments.

The localization algorithm is evaluated with simulation examples over statistically modeled underwater acoustic communication channels and may verify that the exemplary beacon-assisted localization technique offers superior positioning accuracy than state-of-the-art methods that rely on $L_2$-norm based MUltiple-SIgnal-Classification (MUSIC) estimation of the angles-of-arrival and codes of the beacons. Further, superior performance of the exemplary localization algorithm is verified using experimental data that were acquired from the deployment of an acoustic array with three hydrophone elements and two acoustic coded beacons in a water tank. In examples, the inventors describe underwater acoustic positioning using data from a seven-element underwater acoustic array that is deployed in a 30 ft deep acoustic water tank. In particular, the position of two non-coded acoustic sources is estimated using $L_1$-norm principal component analysis of the data.

The examples overcome the problem of robust self-localization of underwater robots with no GPS assistance and no availability of global clock synchronization. In particular, the examples demonstrate self-localization of autonomous underwater vehicles (AUVs) that are equipped with a triangular hydrophone acoustic array and leverage time-domain coded beacons from two single-hydrophone acoustic nodes that are placed at known locations. In examples, collected data snapshots over time at the hydrophone array may be organized in a tensor data structure. Highly robust iteratively refined $L_1$-norm space-time tensor subspaces that are calculated at the underwater acoustic array receiver allow accurate estimation of the azimuth and elevation angles-of-arrival and codes of the two beacons.

The relative position of the vehicle with respect to the two beacons can then be determined via signal angle-of-arrival estimation. Simulation studies over statistically modeled underwater acoustic communication channels verify that the exemplary beacon-assisted localization technique offers superior positioning accuracy than state-of-the-art methods that rely on $L_2$-norm based MUltiple-SIgnal-Classification (MUSIC) estimation of the angles-of-arrival and codes of the beacons.

A more natural approach to store and manipulate multi-dimensional data may be given by tensors. Tensor representation allows greater exploitation of the structure of underwater acoustic space-time coded data as they arrive at the input of an acoustic array. In examples, a deployment of an autonomous underwater vehicle (AUV) that is equipped with an equilateral triangular hydrophone acoustic array is described. The AUV can robustly self-localize in 3D by accurately estimating the codes and azimuth and elevation angles-of-arrival of the transmitted beacons from two reference nodes. As discussed in greater detail herein, beacons are single-hydrophone acoustic nodes that are deployed in known locations and transmit time-domain coded signals in a spread-spectrum fashion. Orthogonal codes of length L enable simultaneous beacon transmissions in frequency and time. The transmitted beacons may propagate over UW-A multipath fading channels. The received beacons at the input of the hydrophone array may then be organized in a tensor structure.

The inventors found that underwater acoustic DoA estimation through $L_1$ norm space-time tensor subspaces significantly outperforms both $L_2$-norm PCA-based tensor and matrix processing methods, thus offering superior underwater positioning accuracy. Simulations may be conducted over multipath and Doppler spread channels that are generated by an UW-A channel simulator.

In an exemplary system model, underwater acoustic transmissions from K asynchronous single-hydrophone UW-A beacons over single-input multiple-output (SIMO) frequency-selective fading channels with M resolvable paths as depicted in FIG. 1 are considered. FIG. 1 illustrates an exemplary system setup of K=2 single-hydrophone underwater acoustic beacons 10, 12 and a triangular hydrophone acoustic array receiver 18. The transmitted signal of the k-th acoustic beacon may be written as $$x_k(t) = \sqrt{E_k} \sum_n b_k[n] s_k(t - nT) e^{j(2\pi f_c t + \phi_k)} \quad (1)$$

where $\phi_k$ is the carrier phase, $f_c$ is the carrier center acoustic frequency and the n-th symbol for the k-th user $b_k[n]$ is drawn from a complex constellation $\mathcal{C}$ of energy $E_k > 0$, and modulated by an all-spectrum digital waveform $s_k(t)$ that is given by $$s_k(t) = \sum_{l=0}^{L-1} d_k[l] g_{T_c}(t - lT_c) \quad (2)$$

where $$d_k \in \left\{ \pm \frac{1}{\sqrt{L}} \right\}^L$$

is a binary code of length L, and $g_{T_c}(\cdot)$ is a square-root raised cosine (SRRC) pulse with roll-off factor $\alpha$ and duration $T_c$, so that $T = LT_c$. The bandwidth of the k-th transmitted signal is $B = (1+\alpha)/T_c$.

The inventors found that transmitted signals propagate over independent time-varying frequency-selective UW-A channels with M resolvable paths, with $a_{k,m}(t)$ and $\tau_{k,m}(t)$ denoting the m-th path's time-varying amplitude coefficient and path delay for the k-th user, respectively. In this example, $\tau_{k,m}(t)$ can be approximated by a first-order polynomial $\tau_{k,m}(t) = \tau_{k,m} - \beta_{k,m} t$, where $\beta_{k,m} = u_{k,m}/c$, $u_{k,m}$ is the radial velocity of the m-th path and c is the speed of sound in water. After multipath fading channel processing as readily understood by a skilled artisan, the received signal at the input of an equilateral triangular array with 3 elements is given by $$y(t) = \sum_{k=0}^{K-1} \sum_{m=0}^{M-1} a(\phi_k, \theta_k) a_m(t) x_k(t(1+\beta_m) - \tau_m) + n(t) \quad (3)$$

where $a(\phi_k, \theta_k) \in \mathbb{C}^3$ is the hydrophone array response vector for the k-th beacon defined as $$a(\varphi, \theta) = \exp\left\{ j 2\pi \frac{1}{\lambda_c} P^T k(\varphi, \theta) \right\} \in \mathbb{C}^{3 \times 1} \quad (4)$$

where $\lambda_c$ is the carrier wavelength, the matrix P contains the hydrophone array element values $$P = \begin{bmatrix} x_1 & x_2 & \ldots & x_D \\ y_1 & y_2 & \ldots & y_D \\ z_1 & z_2 & \ldots & z_D \end{bmatrix} \in \mathbb{R}^{3 \times 3} \quad (5)$$

and the vector $k(\phi, \theta)$ represents the projection of the received signal's steering vector on the hydrophone array coordinate system defined as $$k(\phi, \theta) = \begin{bmatrix} \cos(\theta)\sin(\phi) \\ \cos(\theta)\cos(\phi) \\ \sin(\theta) \end{bmatrix} \in \mathbb{R}^{3 \times 1}. \quad (6)$$

The carrier demodulated and pulse-matched filtered received signal vector after sampling over the symbol duration and buffering $L_M = L + M - 1$ samples, the n-th received space-code data snapshot is $$Y_n = \sum_{k=1}^{K} \sqrt{E_k} \, b_k[n] a(\phi_k, \theta_k)(H_k d_k)^T + J_n + N_n \in \mathbb{C}^{3 \times L_M} \quad (7)$$

where $H_k \in \mathbb{C}^{L_M \times L}$ is the multipath channel matrix for the k-th beacon, which may be invariant over channel coherence time $T_{coh}$. In examples, the inventors assume the same fading and multipath fading across all the array elements for each beacon. Colored interference by $J[n] \in \mathbb{C}^{3 \times L_M}$ models colored interference at the input of the hydrophone array, and $[N[n]]_{i,j}$ is an additive noise component.

Ambient noise in the underwater acoustic channel is frequency-dependent and may be produced by sources such as turbulence, wave action, ship traffic, and thermal noise from random motion of water molecules, as understood by a skilled artisan. The power spectral density of ambient UW-A noise can be approximated as $$N_{AVG}(f) = 50 - 18 \log(f) \, \text{dB re} \, \frac{\mu\text{Pa}}{\text{Hz}} \quad (8)$$

for frequency f in kHz [21]. The term re µPa denotes with reference to the intensity of a plane wave with RMS pressure of 1 µPa. In examples, this reference is considered to be at a distance of 1 m from the sound source.

By defining the power-scaled signature matrix $S = [s_1, \ldots, s_K] \in \mathbb{R}^{L_M \times K}$, where $s_k = \sqrt{P_k} H_k d_k$, the rank-3 steering matrix $A = [a(\phi_1, \theta_1), \ldots, a(\phi_K, \theta_K)] \in \mathbb{C}^{3 \times K}$, and a diagonal matrix $B[n] = \text{diag}([b_1[n], b_2[n], \ldots, b_K[n]])$, the n-th received data snapshot matrix in Equation (7) can be expressed in the following matrix form.

$$Y_n = AB_n S^T + J_n + N_n \in \mathbb{C}^{3 \times L_M}, \, n = 1, 2, \ldots, N. \quad (9)$$

The received matrices can be viewed as slices of an $3 \times L_M \times N$ three-way tensor $\mathcal{Y} \in \mathbb{C}^{3 \times L_M \times N}$. The tensor structure of the data is used to accurately estimate the angles of arrival, as well as identify the waveforms the beacons are using.

As an exemplary direction-of-arrival estimation through $L_1$-norm space-time tensor subspaces, the real-valued representation $\overline{A} \in \mathbb{R}^{2m \times 2n}$ of any complex-valued matrix $A \in \mathbb{C}^{m \times n}$ may be defined by concatenating real and imaginary parts as follows $$\overline{A} = \begin{bmatrix} \text{Re}\{A\}, & -\text{Im}\{A\} \\ \text{Im}\{A\}, & \text{Re}\{A\} \end{bmatrix} \in \mathbb{R}^{2m \times 2n} \quad (10)$$

where $\text{Re}\{\bullet\}$ and $\text{Im}\{\bullet\}$ return the real and imaginary part of each matrix element, respectively. The transition from $A \in \mathbb{C}^{m \times n}$ to $\overline{A} \in \mathbb{R}^{2m \times 2n}$ is based on complex-number realification in representation theory. Realification allows for any complex system of equations to be converted and solved through a real system.

For an exemplary DoA estimation and beacon identification, by Equation (10), the n-th "realified" snapshot $\overline{Y}_n$ is defined as $$\overline{Y}_n = \overline{A} \, \overline{B}_n \, \overline{S}^T + \overline{N}_n \in \mathbb{R}^{6 \times 2L_M}, \, n = 1, 2, \ldots, N. \quad (11)$$

With the realification operation, the complex tensor $\mathcal{Y} \in \mathbb{C}^{3 \times L_M \times N}$ may be converted to a real-valued tensor $\overline{\mathcal{Y}} \in \mathbb{R}^{6 \times 2L_M \times N}$. From Equation (11), the angle components of interest lie in the $R_1 \geq 2K$ dimensional space $\mathcal{S}_A = \text{span}(\overline{A})$ while the code components of interest lie in the 2K dimensional space $\mathcal{S}_D = \text{span}(\overline{S})$ The following examples highlight the utility of $\mathcal{S}_A$ and $\mathcal{S}_D$ for estimating the target directions of arrival (DoA's) and code sequences in $\mathcal{A}$ and $\mathcal{D}$, respectively.

Example 1. For any pair $$(\phi, \theta) \in \left(-\frac{\pi}{2}, \frac{\pi}{2}\right],$$

$\text{span}(\overline{a}(\phi, \theta)) \subseteq \mathcal{S}_A$ if and only if $(\phi, \theta) \in \mathcal{A}$. Set equality holds only if K=1. By Example 1, the inventors can accurately decide whether some pair $$(\phi, \theta) \in \left(-\frac{\pi}{2}, \frac{\pi}{2}\right]$$

is a target DoA or not by means of any orthonormal basis $Q_1 \in \mathbb{R}^{6 \times 2K}$ that spans $\mathcal{S}_A$ as $$(I_6 - Q_1 Q_1^T)\overline{a}(\phi, \theta) = 0_{6 \times 2} \Leftrightarrow (\phi, \theta) \in \mathcal{A}. \quad (12)$$

This may be decided for the candidate azimuth angle φ and elevation angle θ by looking for the angles that maximize the power pseudo-spectrum quantity in Equation (13) below. Thus, in view of Example 1, and in accordance to common practice in the array signal processing research community, target DoAs in $\mathcal{A}$ can be approximated by the K highest peaks of the MUSIC-like pseudo-spectrum defined as $$P_A(\phi, \theta) = \|(I_6 - Q_1 Q_1^T)\overline{a}(\phi, \theta)\|^{-2} \quad (13)$$

The same holds for the waveform estimation problem, as stated in the following example.

Example 2. For any $$d \in \left\{ \pm \frac{1}{\sqrt{L}} \right\}^L,$$

span($\bar{d}$)$\subseteq S_D$ if and only if $d \in \mathcal{D}$. Set equality holds only if $K=1$. By Example 2, the target code sequences can be estimated by any $R_2 \geq 6$ dimensional orthonormal basis $Q_2 \in \mathbb{R}^{2L_M \times 2K}$ that spans $S_D$ as $$(I_6 - Q_2 Q_2^T)\bar{d} = 0_{6 \times 2} \Leftrightarrow \bar{d} \in \mathcal{D}. \quad (14)$$

And the corresponding pseudo-spectrum is $$P_D(\bar{d}) = \left\| (I_{2L_M} - Q_2 Q_2^T)\bar{d} \right\|^{-2}. \quad (15)$$

Maxima of the power pseudo-spectra in Equation (13) identify candidate azimuth and elevation angles-of-arrival for the beacons while maxima of the power pseudo-spectra in Equation (15) identify candidate code sequences for the beacons. However, peaks in the two pseudo-spectra in Equations (13) and (15) identify DoAs and waveform sequences without uniquely associating angles and sequences. In order to have this correspondence, all possible DoA pairs and waveform sequence candidates may be created as $$z(\phi, \theta, d) = a(\phi, \theta) \otimes d \in \mathbb{C}^{3L_M \times 1}. \quad (16)$$

Then, the K principal components, $Q_{sc}$, of the space-code matrix $Y_{sc}=[\text{vec}(Y_1), \ldots, \text{vec}(Y_N)]$ may be determined by means of SVD. The following pseudo-spectrum may be used to find the peaks corresponding to the exact DoAs and waveform sequence associations $$P_{SC}(z) = \| (I_{3L_M} - Q_{sc} Q_{sc}^H) z \|^{-2}. \quad (17)$$

Following the TUCKER tensor model, the $L_2$-norm tensor subspace estimation problem for a 3-dimensional tensor $\chi \in \mathbb{R}^{D \times L \times N}$ can be written as $$\bar{Q}_1, \bar{Q}_2, \bar{Q}_3 = \text{argmax} \| Q_1^T X_{(1)} (Q_2 \otimes Q_3) \|_F^2 \quad (18)$$

$$U \in \mathbb{R}^{D \times R_1}, Q_1^T Q_1 = I_{R_1},$$
$$Q_2 \in \mathbb{R}^{L \times R_2}, Q_2^T Q_2 = I_{R_2},$$
$$Q_3 \in \mathbb{R}^{N \times R_3}, Q_3^T Q_3 = I_{R_3}$$

where $\|\cdot\|_F$ returns the summation of the absolute squares of the input matrix elements, and $X_{(1)} \in \mathbb{C}^{D \times LN}$ denotes the matricization of the tensor $\chi \in \mathbb{C}^{D \times L \times N}$ with respect to the columns. The tensor subspaces may be determined using the TUCKER-Alternating Least Squares (ALS) approached. A primary idea behind this approach is to solve for one factor matrix at a time by fixing the rest, as well understood by a skilled artisan. In that manner, each subproblem is reduced to a linear least-squares problem solved by singular value decomposition.

Regarding iteratively refined $L_1$-norm tensor subspaces, $L_2$-norm matrix and tensor decompositions are susceptible to corrupted, highly deviating, irregular measurements in the received signal record, such as impulsive noise. An approach to PCA and TUCKER with increased robustness to outliers is $L_1$-norm based tensor decompositions. Tensor subspaces are continuously refined by calculating the conformity of each received signal element with respect to the other received signals. The calculated tensor subspaces indicate unprecedented subspace estimation performance and resistance to intermittent disturbances.

The performance of the exemplary DoA estimation scheme may be evaluated in terms of root-mean-squared error (RMSE). The performance of the DoA estimation scheme is compared to state-of-the-art matrix and tensor $L_2$-norm based DoA estimation techniques. The inventors consider two beacons transmitting time-domain coded waveforms to a triangular hydrophone array receiver. Simulations are carried out using time-varying channel realizations, generated by an UW-A channel simulator that follows a statistical model where the channel is modeled as a superposition of multiple propagation paths, whose lengths and relative delays are calculated from the channel geometry. The statistical properties of the channel are assessed using experimental signals from field test.

FIG. 1 depicts an exemplary localization system 5 having two beacons 10, 12 shown deployed in a 20 m deep UW-A channel. Each beacon 10, 12 may include a transmitter 14, 16 fixed at about 9 m and 12 m, respectively, above the seabed, and positioned about 300 m and 500 m away from a hydrophone array receiver 18 attached to an AUV 20. Each beacons 10, 12 is shown in this example attached to a buoy 22 and includes a beacon housing 24 that may house electronics (not shown) for underwater communications. While not being limited to a particular configuration, each transmitter 14, 16 is attached to a respective one of the beacon housings 24 as appropriate to transmit coded data signals $d_1$ and $d_2$ to the array receiver 18. In FIG. 1, the array receiver 18 is fixed at about 5 m above the seabed. From this geometry, propagation paths and delays are calculated for each beacon. Channel variations that account for effects such as surface scattering are introduced to the simulation studies, while ambient noise is generated, for example as discussed above according to Equation (8).

Figure 2:
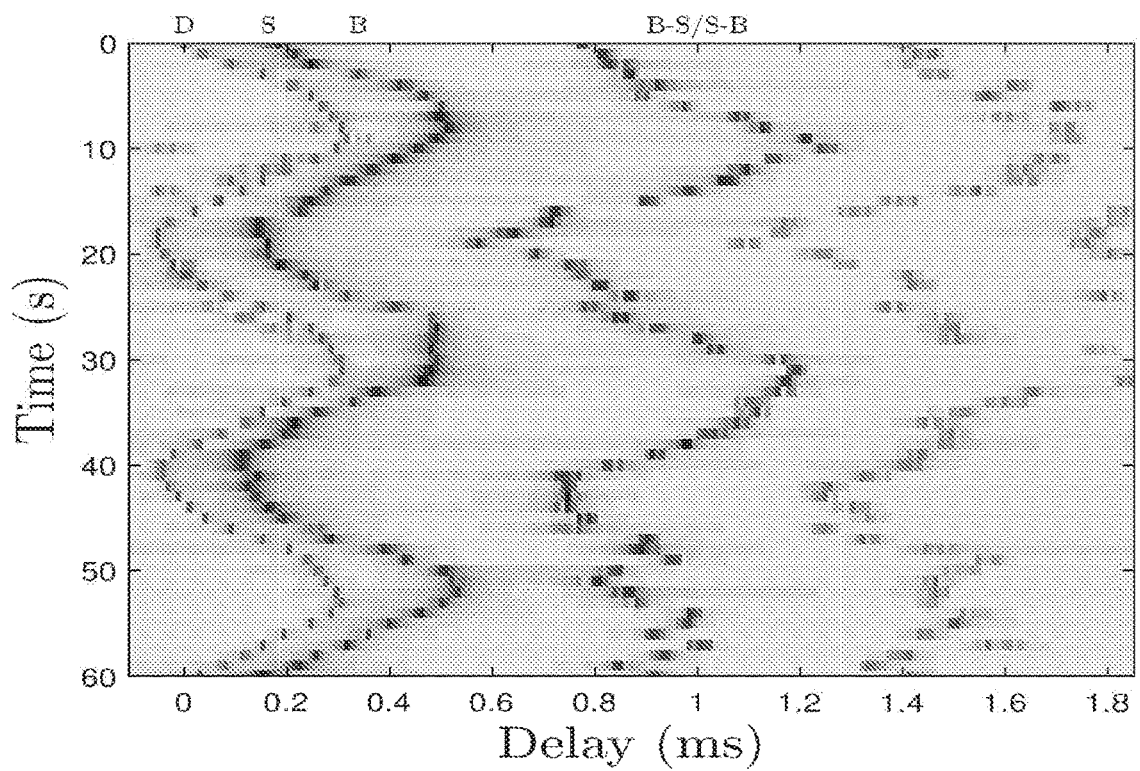
FIG. 2 illustrates an exemplary relative magnitude and time delay of channel paths over time for a link between a first beacon node and a hydrophone array.
Figure 3:
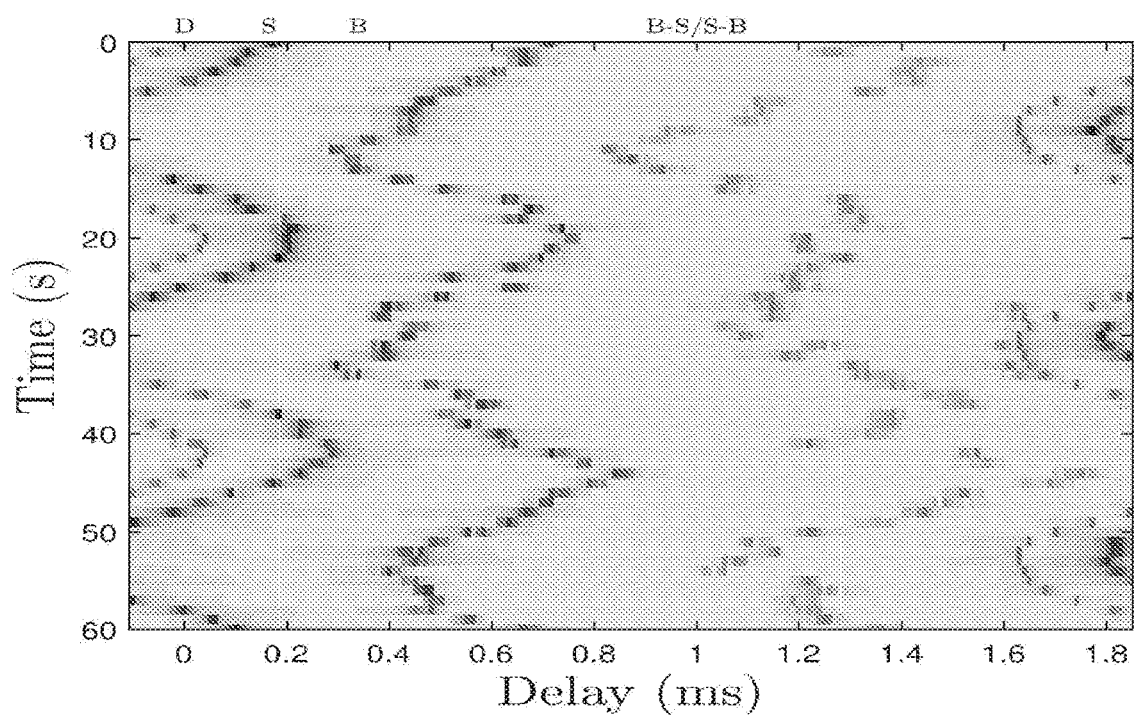
FIG. 3 illustrates an exemplary relative magnitude and time delay of channel paths over time for a link between a second beacon node and a hydrophone array.

In exemplary simulations, the coherence time of small-scale channel variations is set to one second (1 s). Channel gains for the simulated UW-A channel are shown in FIG. 2 and FIG. 3 as a function of induced time delay, with FIGS. 2 and 3 depicting the relative magnitude and time delay of distinct paths of the underwater acoustic channel between beacon 10 and the array receiver 18 and between beacon 12 and the array receiver 18, respectively. In particular, FIG. 2 illustrates an exemplary relative magnitude and time delay of channel paths over time for the link between the first beacon 10 (300 m), and the hydrophone array 14. FIG. 3 illustrates an exemplary relative magnitude and time delay of channel paths over time for the link between the second beacon 12 (500 m), and the hydrophone array 18. Labels denote the direct (D) path, surface reflection (S), bottom reflection (B), and the bottom-surface (B-S) and surface-bottom (S-B) reflections which should arrive approximately simultaneously. Frame transmissions of binary phase-shift keying (BPSK) symbols are considered. The beacons 10, 12 utilize Hadamard codes of length L=4 for their transmissions at frequency $f_c$=5 KHz using bandwidth B=1 KHz and roll-off factor $\alpha$=0.6.

Referring to FIGS. 2 and 3 in greater detail, Label D on the leftmost axis on the top of FIGS. 2 and 3 denotes the magnitude and delay over time of the direct acoustic propagation channel path between beacons 10, 12 and the array receiver. Label S denotes the magnitude and delay over time of the channel path that results from reflection of the transmitted wave from beacons 10, 12 from the sea surface. Label B denotes the magnitude and delay over time of the channel path that results from reflection of the transmitted wave from beacons 10, 12 from the sea bottom. Label B-S denotes the magnitude and delay over time of additional channel paths that result from bottom-surface reflections of the transmitted wave from beacons 10, 12. Label S-B denotes the magnitude and delay over time of additional channel paths that result from surface-bottom reflections of the transmitted wave from beacons 10, 12. Both FIG. 2 and FIG. 3 are generated from an underwater-acoustic channel simulator and offer the opportunity to evaluate the accuracy and resolution of the exemplary localization system (depicted in FIGS. 4-12) prior to the deployment of the exemplary testbed (FIGS. 13 and 19) in water tank 34, as will be described in greater detail below.

Figure 4:
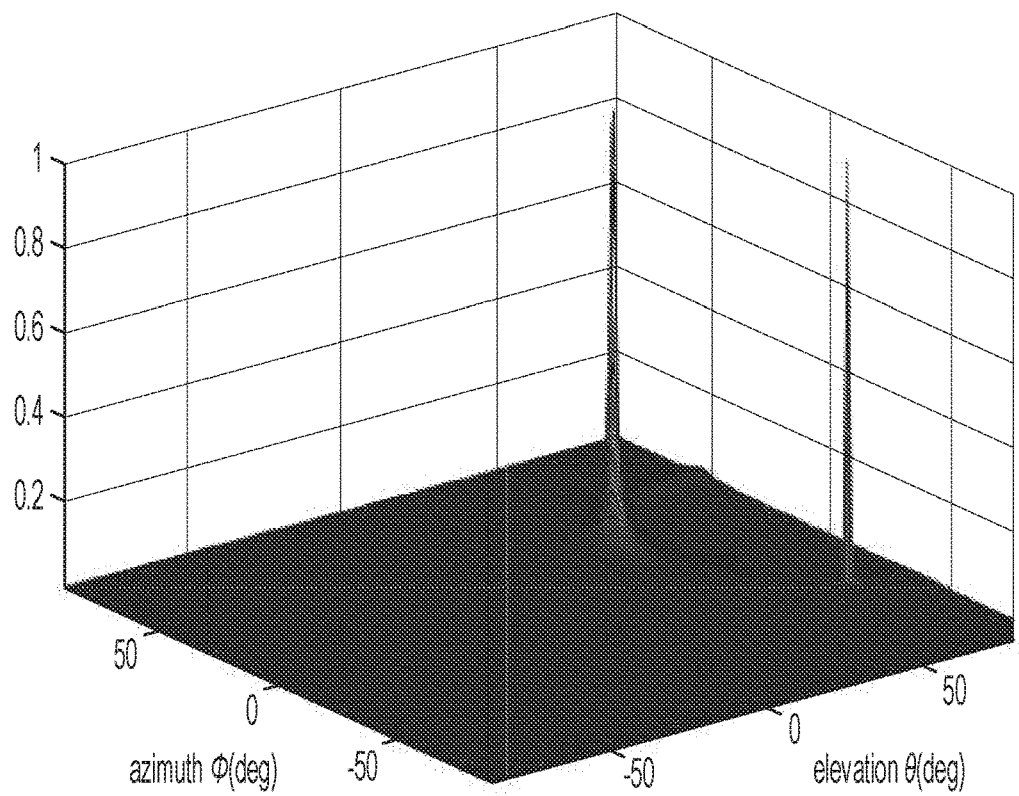
FIG. 4 illustrates exemplary power pseudo-spectra of elevation and azimuth angles-of-arrival.
Figure 5:
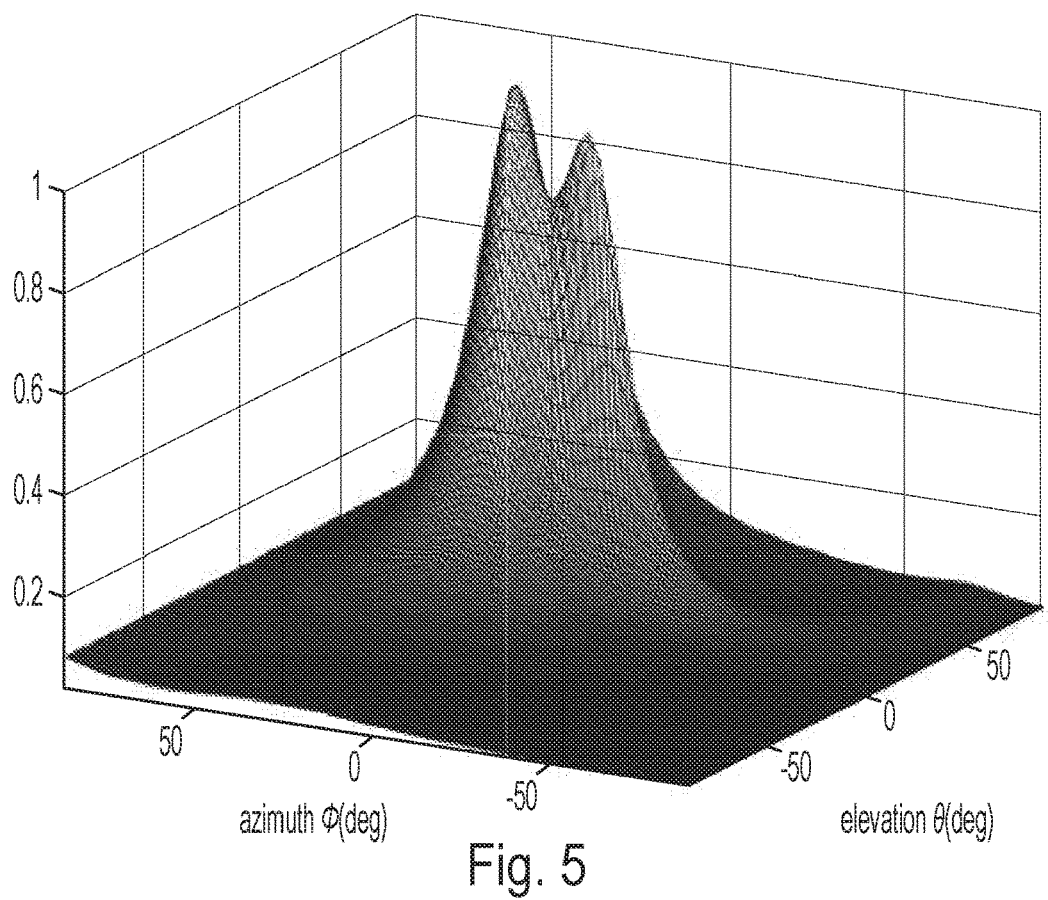
FIG. 5 illustrates power pseudo-spectra of elevation and azimuth angles-of-arrival according to examples.

FIG. 4 depicts the pseudo-spectra of the elevation and azimuth angles-of-arrival calculated according to Equation (13) prior to using each beacon's code to identify the beacon of interest. In other words, FIG. 4 illustrates power pseudo-spectra of elevation and azimuth angles-of-arrival that are candidate estimates of the true elevation and azimuth angles-of-arrival after $L_1$-norm tensor decomposition of the two beacons. FIG. 5 illustrates exemplary power pseudo-spectra of elevation and azimuth angles-of-arrival that are candidate estimates of the true elevation and azimuth angles-of-arrival after $L_2$-norm Tucker ALS tensor decomposition of the two beacons 10, 12. As can be seen from FIGS. 4 and 5, $L_1$-norm tensor analysis offers superior DoA estimation performance compared to its $L_2$-norm counterpart.

Figure 6:
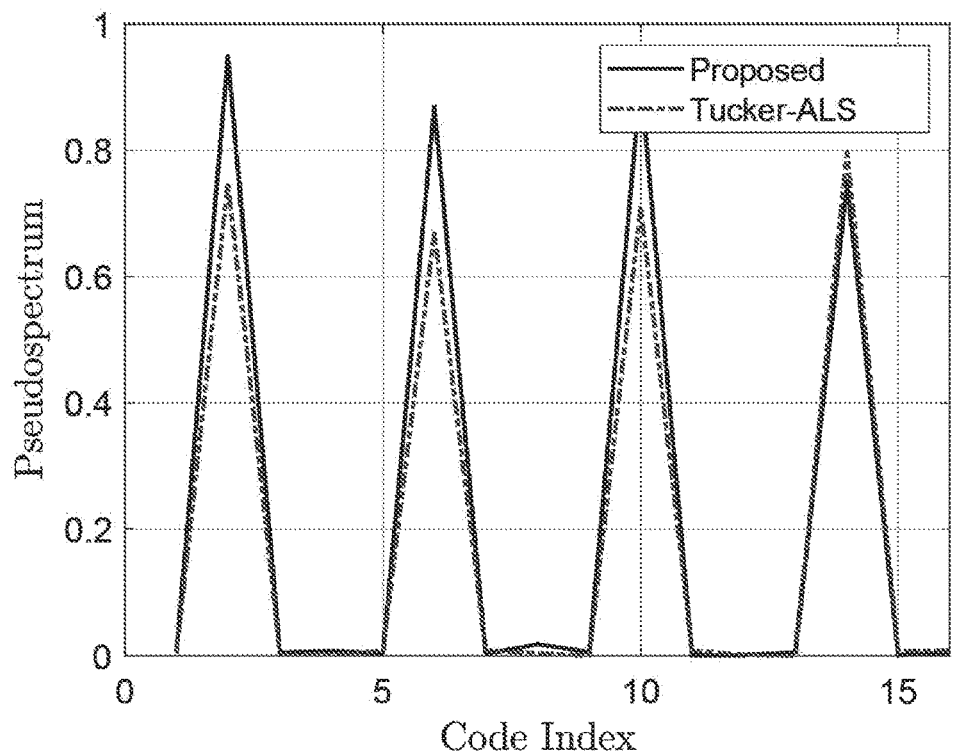
FIG. 6 illustrates exemplary power pseudo-spectra of code sequences.

FIG. 6 illustrates the power pseudo-spectra corresponding to the candidate code sequences for beacon 10 and beacon 12 that may be calculated according to Equation (15) and are candidate estimates of the true code sequences of the two beacons after $L_1$-norm and $L_2$-norm Tucker-ALS tensor decomposition of the two beacons. The power pseudo-spectrum shows values from zero to one, with zero denoting its minimum and one its maximum value. The pseudo-spectrum in Equation (15) is a function of the code sequence used by beacons 10, 12. In FIG. 6 the inventors use binary antipodal code sequences of length L=4 that take values 1 and −1. For example the code sequence used by beacon 10 is [1, −1, 1, −1] and the code sequence used by beacon 12 is [1, 1, −1, −1]. This results in a total of $2^4$ or 16 combinations of binary antipodal code sequences that are candidate solutions to the problem of maximizing the power pseudo-spectrum in Equation (15). FIG. 6 shows that the code indices with the maximum power pseudo-spectrum value are only four. Consequently, these four sequences are the candidate solutions to the problem of maximizing the power pseudo-spectrum in Equation (15).

Figure 7:
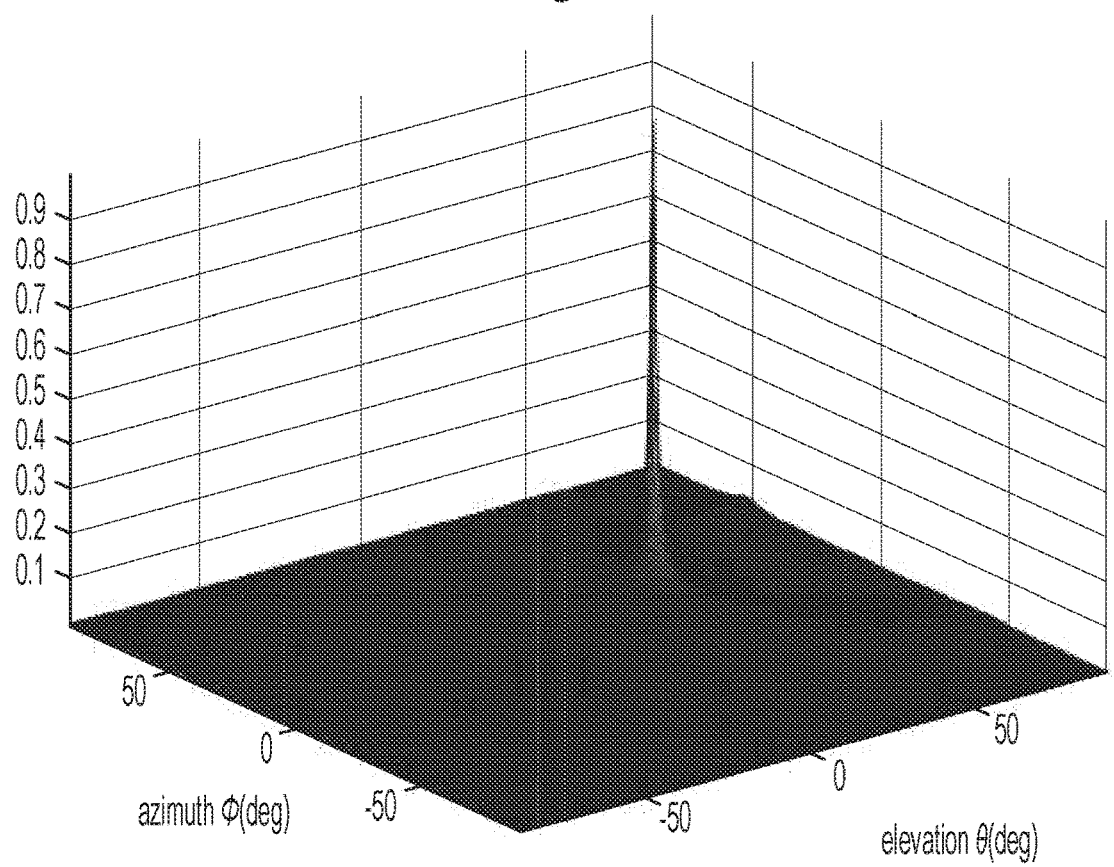
FIG. 7 illustrates azimuth and elevation pseudo-spectra for $L_1$-norm tensor decomposition of a first beacon.
Figure 8:
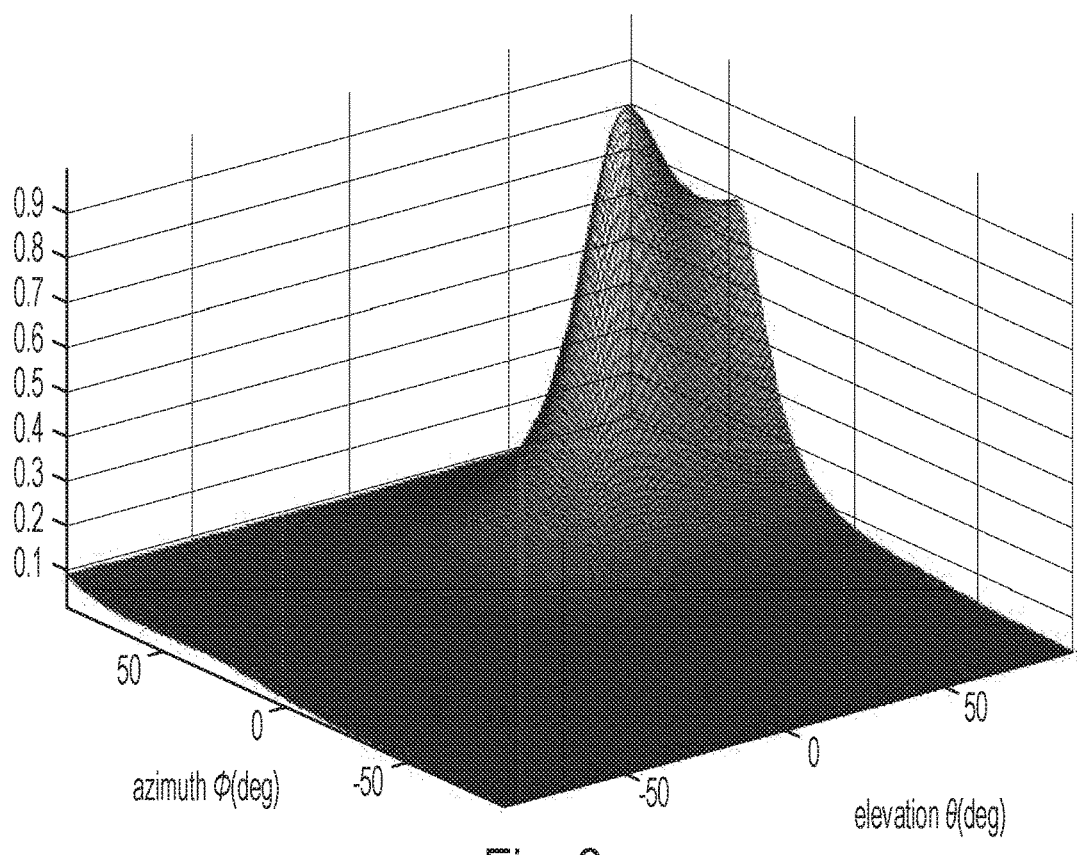
FIG. 8 illustrates azimuth and elevation pseudo-spectra for $L_2$-norm tensor decomposition of a first beacon.
Figure 9:
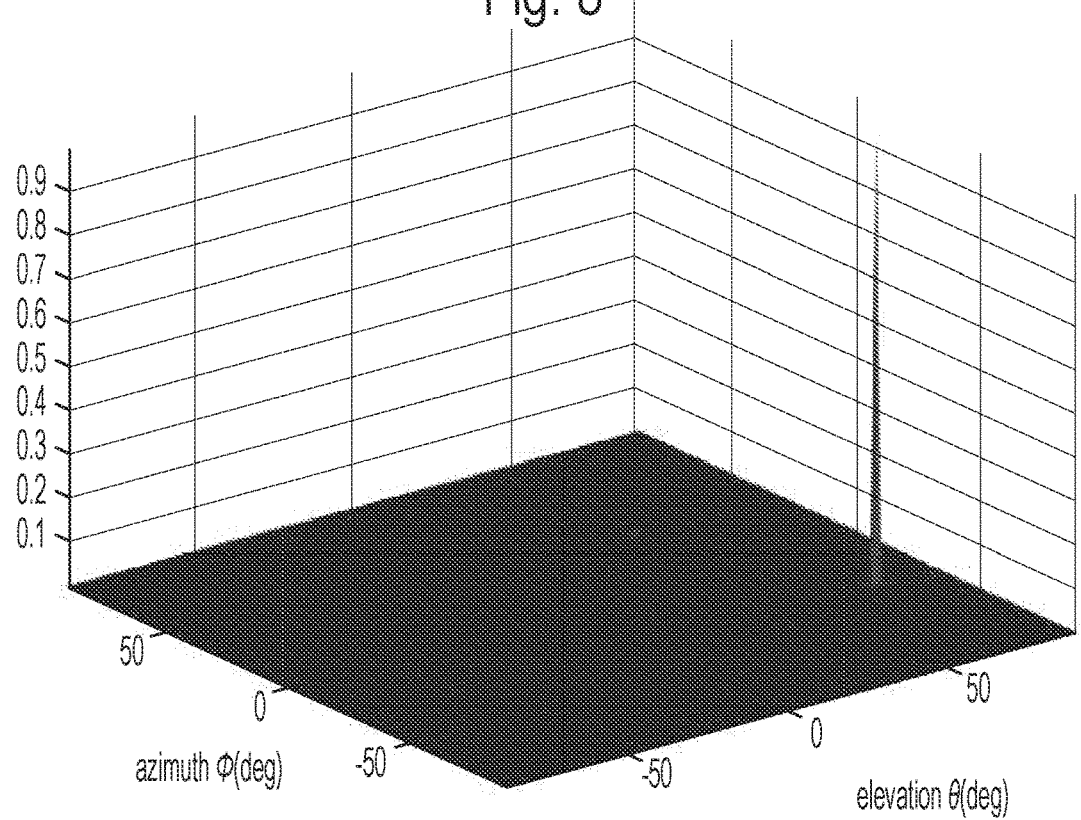
FIG. 9 illustrates azimuth and elevation pseudo-spectra for $L_1$-norm tensor decomposition of a second beacon.
Figure 10:
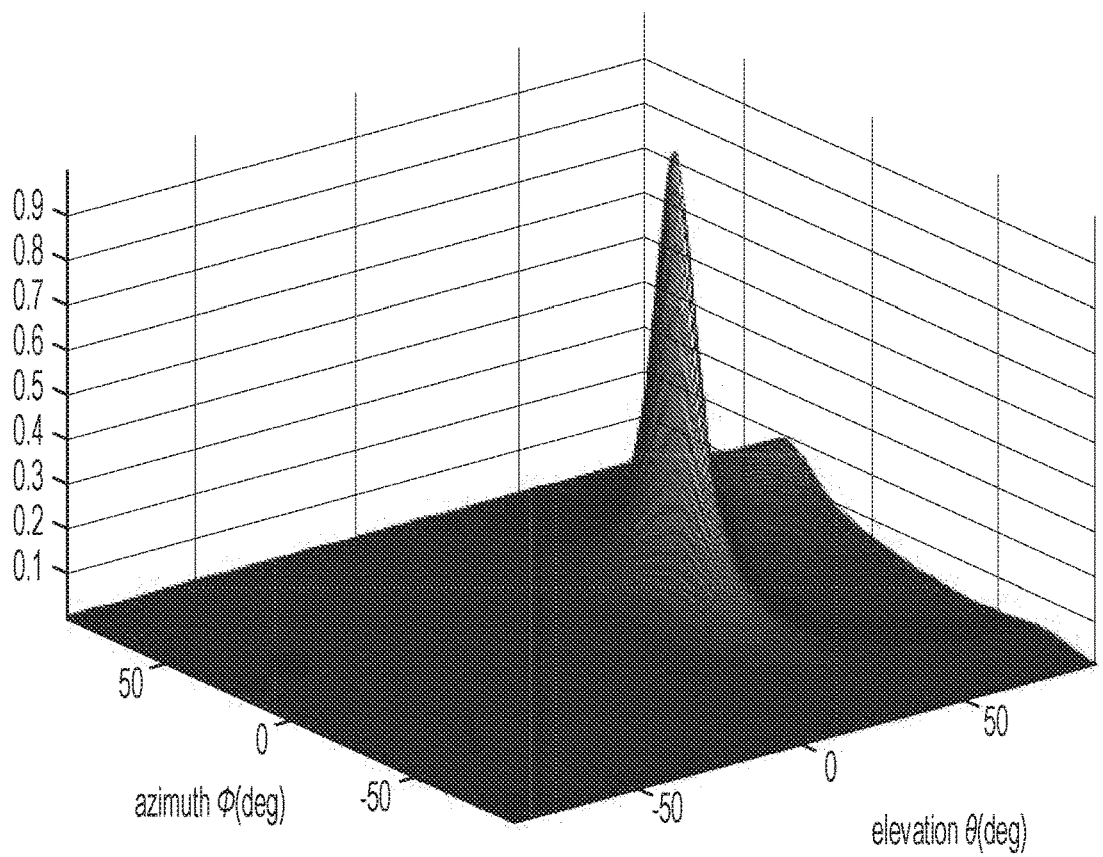
FIG. 10 illustrates azimuth and elevation pseudo-spectra for $L_2$-norm tensor decomposition of a second beacon.

FIG. 7, FIG. 8, FIG. 9 and FIG. 10 depict the pseudo-spectra corresponding to the elevation and azimuth angles calculated according to Equation (17) after utilizing the estimated beacon code to identify the triplet($\phi$, $\theta$, d). In particular, FIG. 7 illustrates exemplary maximum-power pseudo-spectrum of the elevation and azimuth angle-of-arrival of beacon 10 after searching across all candidate triplets of elevation, azimuth angle-of-arrival pairs code sequences and considering $L_1$-norm tensor decomposition of the two beacons 10, 12. FIG. 8 illustrates exemplary maximum-power pseudo-spectrum of the elevation and azimuth angle-of-arrival of beacon 10 after searching across all candidate triplets of elevation, azimuth angle-of-arrival pairs code sequences and considering $L_2$-norm Tucker-ALS tensor decomposition of the two beacons 10, 12. Further, FIG. 9 illustrates exemplary maximum-power pseudo-spectrum of the elevation and azimuth angle-of-arrival of second beacon 12 after searching across all candidate triplets of elevation, azimuth angle-of-arrival pairs code sequences and considering $L_1$-norm tensor decomposition of the two beacons 10, 12. FIG. 10 illustrates exemplary maximum-power pseudo-spectrum of the elevation and azimuth angle-of-arrival of second beacon 12 after searching across all candidate triplets of elevation, azimuth angle-of-arrival pairs code sequences and considering $L_2$-norm Tucker-ALS tensor decomposition of the two beacons. It can be seen from the drawings that the exemplary iteratively-refined $L_1$-norm tensor decomposition method produces a disturbance-free, uncorrupted spectrum (FIG. 7), in contrast to the TUCKER-ALS spectrum which is contaminated by the underwater channel variations and disturbances (FIG. 8).

Figure 11:
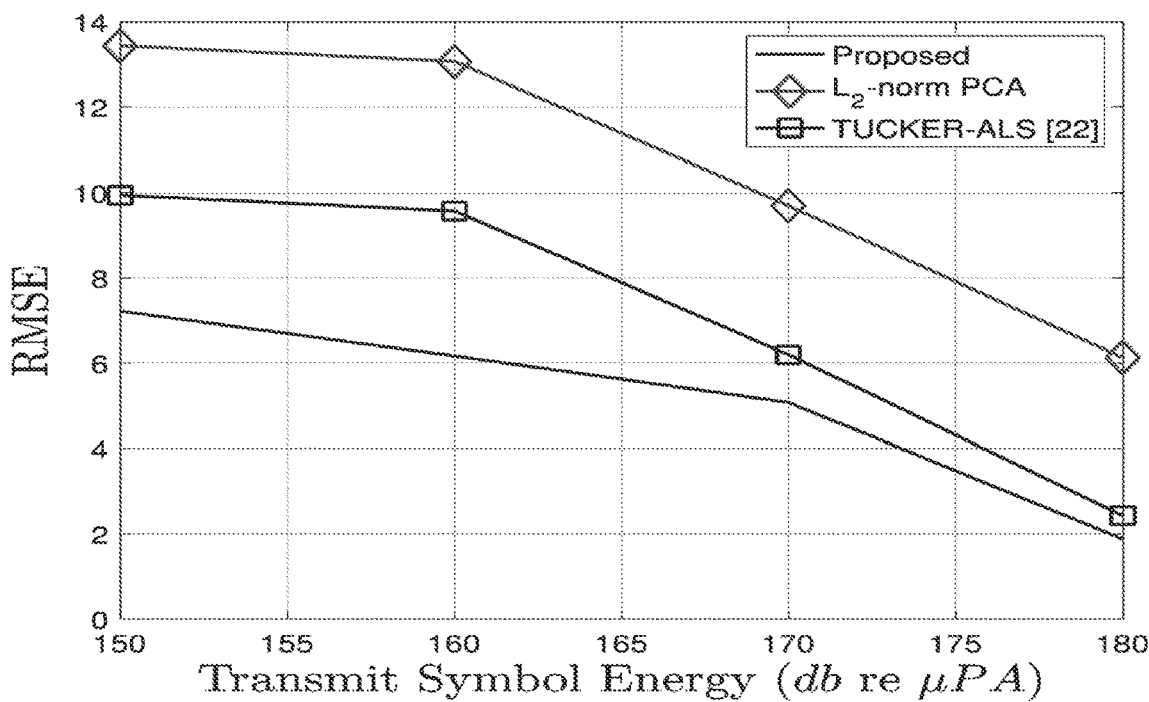
FIG. 11 illustrates the Root-Mean-Squared-Error (RMSE) of the exemplary DoA estimation method after beacon identification for a first beacon node vs. state-of-the-art tensor and matrix-based space-time processing techniques.
Figure 12:
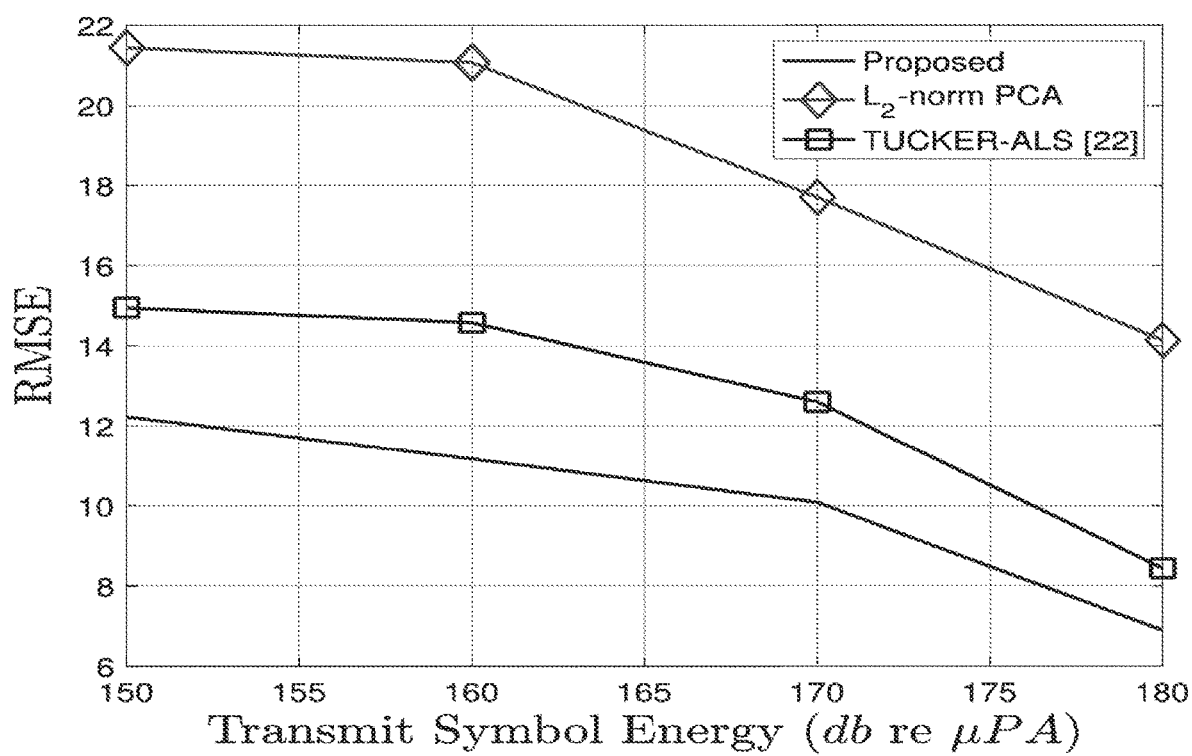
FIG. 12 illustrates exemplary RMSE performance of the estimated azimuth and elevation angle-of-arrival for second beacon.

FIG. 11 illustrates the Root-Mean-Squared-Error (RMSE) of the exemplary DoA estimation method after beacon identification for the first beacon 10 vs. state-of-the-art tensor and matrix-based space-time processing techniques. In particular, FIG. 11 illustrates exemplary RMSE performance of the estimated azimuth and elevation angle-of-arrival for first beacon 10 calculated over 5000 independent trials for four different symbol energy settings. FIG. 12 illustrates exemplary RMSE performance of the estimated azimuth and elevation angle-of-arrival for the second beacon 12 calculated over 5000 independent trials for four different symbol energy settings.

The inventors consider equal transmitted symbol energy for both beacons 10 and 12. The RMSE performance of an exemplary DoA estimation based on $L_1$-norm tensor decomposition of the two beacons is compared to other tensor and space-time matrix-based processing techniques. FIG. 11 and FIG. 12 depict the RMSE defined as $$RMSE_k = \sqrt{\frac{1}{N}\sum_{n=1}^{N}\left(\phi_k - \hat{\phi}_n\right)^2 + \left(\theta_k - \hat{\theta}_n\right)^2}, k = 1, \ldots, K \quad (19)$$

for the exemplary DoA estimator for the first beacon 10 as a function of the transmitted symbol energy $E_k$ in dB re μPa. The RMSE is calculated over N=5000 independent trials. The true azimuth and elevation angles of arrival for the two beacons are ($\phi_1$=30°, $\theta_1$=40°), and ($\phi_2$=−30°, $\theta_2$=60°), which correspond to the true azimuth and elevation angles of the first beacon 10 and second beacon 12 in FIG. 1.

As noted above, FIG. 7 depicts the estimates of the azimuth and elevation angle-of-arrival for the first beacon 10 (or transmitter 14 thereof) after $L_1$-norm tensor decomposition. FIG. 9 depicts the estimates of the azimuth and elevation angle-of-arrival for the second beacon 12 (or transmitter 16 thereof) after $L_1$-norm tensor decomposition. Maxima of the power pseudo-spectra, that are calculated from Equation (17), determines the estimates of the azimuth and elevation angle-of-arrival and their association with each of the candidate code sequence for beacons 10 and 12 (calculated from the maxima of the power pseudo-spectra from Equation (15)).

The transmitted symbol energy was fixed to be equal for both beacons. The $L_1$-norm tensor DoA technique is compared to $L_2$-norm PCA space-time processing, and $L_2$-norm TUCKER-ALS tensor processing methods. As shown, the exemplary DoA estimation method offers significantly better RMSE performance. Similar RMSE performance can be observed for the second beacon 12 (500 m) in FIG. 12, which illustrates the RMSE of DoA estimation after beacon identification for beacon 12.

Accordingly, the beacon-assisted underwater localization system and method described herein can be utilized for 3D self-localization of AUVs. Robust DoA-guided localization of AUVs is achieved by iteratively refined $L_1$-norm space-time tensor subspaces. The exemplified localization system leverages the tensor structure of space-time coded reference beacon signals at the input of a triangular hydrophone array (that will be mounted on the AUV) to jointly estimate the angles-of-arrival of the beacons, as well as, identify the codes corresponding to each beacon. Simulation studies verify the superiority of the discussed localization technique compared to state-of-the-art $L_2$-norm based tensor and matrix DoA estimation methods.

Figures 13, 14:
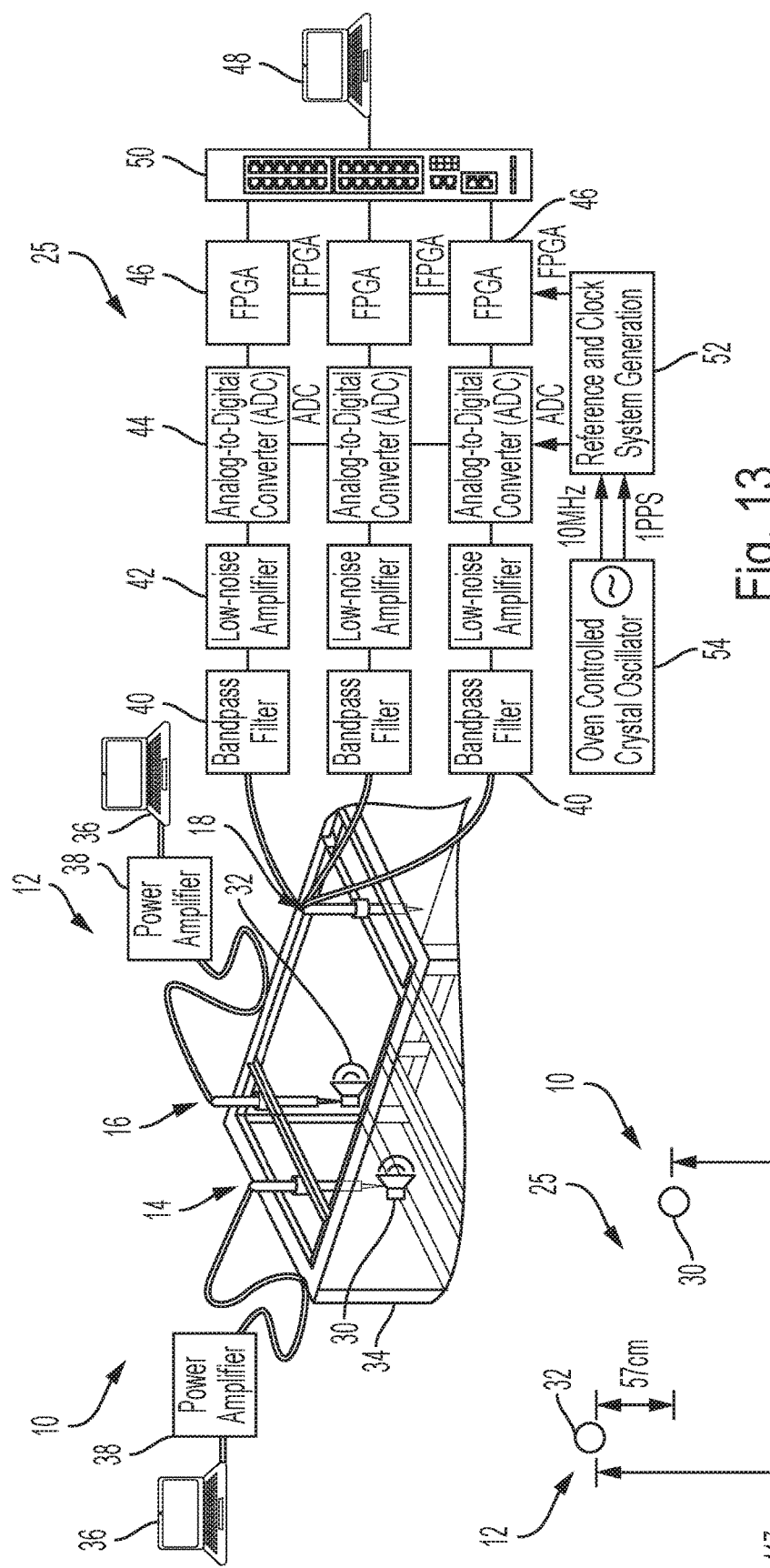
FIG. 13 illustrates exemplary hardware setup of a three-element hydrophone array and two single-element acoustic coded beacons in a water tank.
FIG. 14 illustrates exemplary deployment of a three-element hydrophone array and two single-element acoustic coded beacons in a water tank—all deployed at the same elevation level (60 cm below the water surface) in a water tank.

An exemplary localization system 25 is described below with two beacons 10, 12 having transmitters 14, 16 (e.g., acoustic speakers 30, 32) and an array receiver 18 (e.g., three-element hydrophone array receiver) in a water tank 34. FIG. 13 depicts hardware for setting up the two acoustic coded beacons 10, 12 and three-element array receiver 18 in the water tank. While not being limited to particular dimensions, FIG. 14 shows additional information about the localization system 25, including inter-element spacing at the array receiver 18 and between the beacon acoustic speakers 30, 32 and the array receiver, with all three elements of the array receiver deployed at about the same elevation level (e.g., 60 cm below the water surface).

Coded data for the first beacon 10 and second beacon 12 may be generated, for example with software in or accessible via a general purpose processor (e.g. laptop computer 36), and are then converted into analog waveforms by a digital-to-analog converter (not shown) coupled to the processor in the computer. Coded waveforms may be amplified by a power amplifier 38 and converted into sound waves at acoustic speaker 30, 32. At the receiver 18, sound waves are recorded by three hydrophones of the receiver, which may include and/or communicate with electronics for processing the recorded sound wave data. For example, for each hydrophone, a bandpass filter 40 may reject out-of-band noise, and a low-noise amplifier 42 may increase the gain of the received signal at each hydrophone. Analog waveforms from each hydrophone are then down-sampled from an analog-to-digital converter 44 and passed over to a field-programmable-gate-array (e.g., FPGA 46) for digital processing. The recorded data may be digitally processed by an array receiver computer 48 configured to control the FPGAs 46, for example, through an Ethernet switch 50 to identify the angle-of-arrival and code sequence of each beacon. The analog-to-digital converters 44 and field-programmable-gate-arrays 46 may be synchronized, for example by using a common clock signal from a reference clock system generator 52. An oscillator 54 (e.g., oven-controlled crystal oscillator) may generate the reference clock signal.

Figure 15:
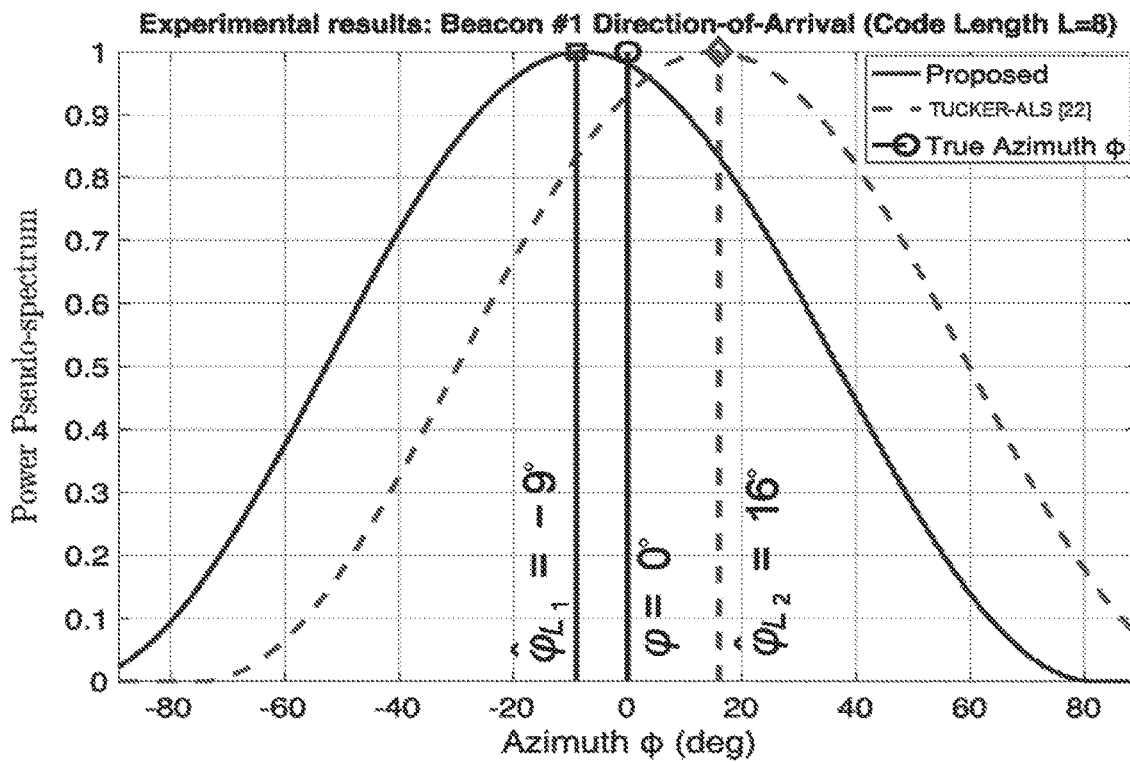
FIG. 15 illustrates exemplary power pseudo-spectra of the azimuth elevation angle-of-arrival of a first acoustic beacon.

FIG. 15 illustrates exemplary power pseudo-spectra of the azimuth elevation angle-of-arrival of beacon 10 acoustic speaker 30 (using code sequence of length L=8) that is deployed in the water tank 34 after L1-norm and L2-norm Tucker-ALS tensor decomposition of the received data at the multi-element array receiver 18. The exemplary method estimates the azimuth angle-of-arrival for acoustic speaker 30 at 9 degrees, while state-of-the-art L2-norm Tucker-ALS estimates the estimates the azimuth angle-of-arrival for acoustic speaker 30 at 16 degrees. The true azimuth angle-of-arrival for acoustic speaker 30 is 0 degrees. The sequence length selection may be done arbitrarily at the two beacons. If needed, optimization of the code sequence length can be carried out based on feedback and cooperation with the hydrophone array received to further improve the accuracy of the system. In this example, L denotes the sequence of the length. For code sequences of length L=8 we have $2^8$ or 256 candidate sequences that maximize the power pseudo-spectrum value of Equation (15). In examples, the hydrophone array receiver has a priori knowledge of the code index and code length that each of the two beacons is using.

Figure 16:
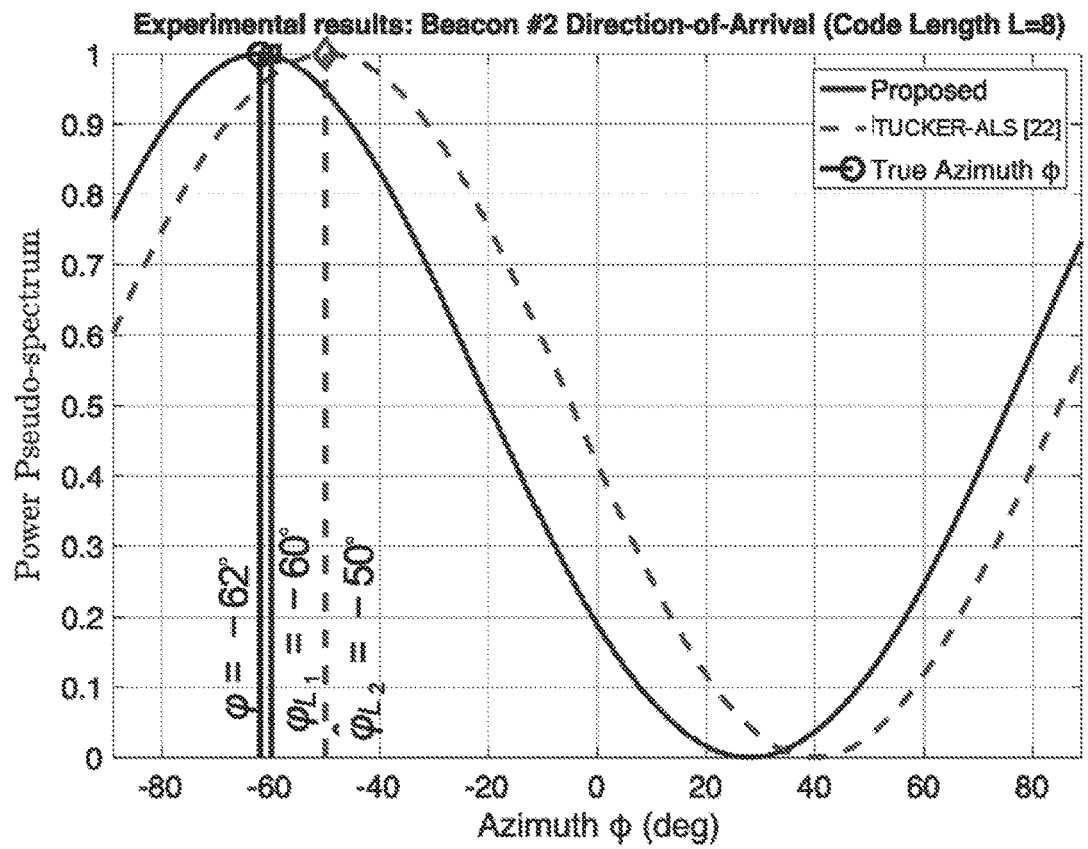
FIG. 16 illustrates exemplary power pseudo-spectra of the azimuth elevation angle-of-arrival of a second acoustic beacon.

FIG. 16 illustrates exemplary power pseudo-spectra of the azimuth elevation angle-of-arrival of beacon 12 acoustic speaker 32 (using code sequence of length L=8) that is deployed in water tank 34 after L1-norm and L2-norm Tucker-ALS tensor decomposition of the received data at the multi-element array receiver 18. The exemplary method estimates the azimuth angle-of-arrival for acoustic speaker 32 at −60 degrees, while state-of-the-art L2-norm Tucker-ALS estimates the estimates the azimuth angle-of-arrival for acoustic speaker 32 at −50 degrees. The true azimuth angle-of-arrival for acoustic speaker 32 is 62 degrees.

Figure 17:
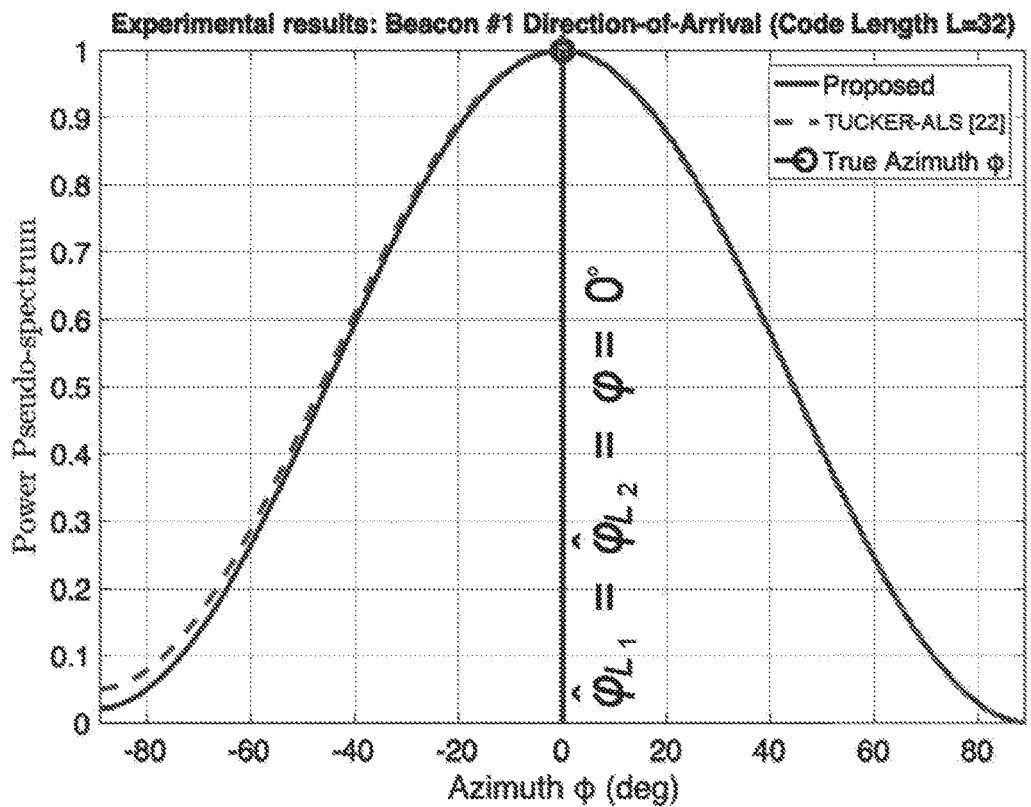
FIG. 17 illustrates exemplary power pseudo-spectra of the azimuth elevation angle-of-arrival of a first acoustic beacon using a longer code sequence length than for FIG. 15.

FIG. 17 illustrates exemplary power pseudo-spectra of the azimuth elevation angle-of-arrival of beacon 10 acoustic speaker 30 (using code sequence of length L=32) that is deployed in a water tank 34 after L1-norm and L2-norm Tucker-ALS tensor decomposition of the received data at the multi-element array receiver 18. Both the exemplary method and state-of-the-art L2-norm Tucker-ALS estimate the azimuth angle-of-arrival for acoustic speaker 30 at 0 degrees. The true azimuth angle-of-arrival for acoustic speaker 30 is 0 degrees. As can be seen in FIG. 15 and FIG. 17, increasing the code length in the two acoustic beacons from L=8 (FIG. 15) to L=32 (FIG. 17) significantly affects the precision of the exemplary localization system 25.

Figure 18:
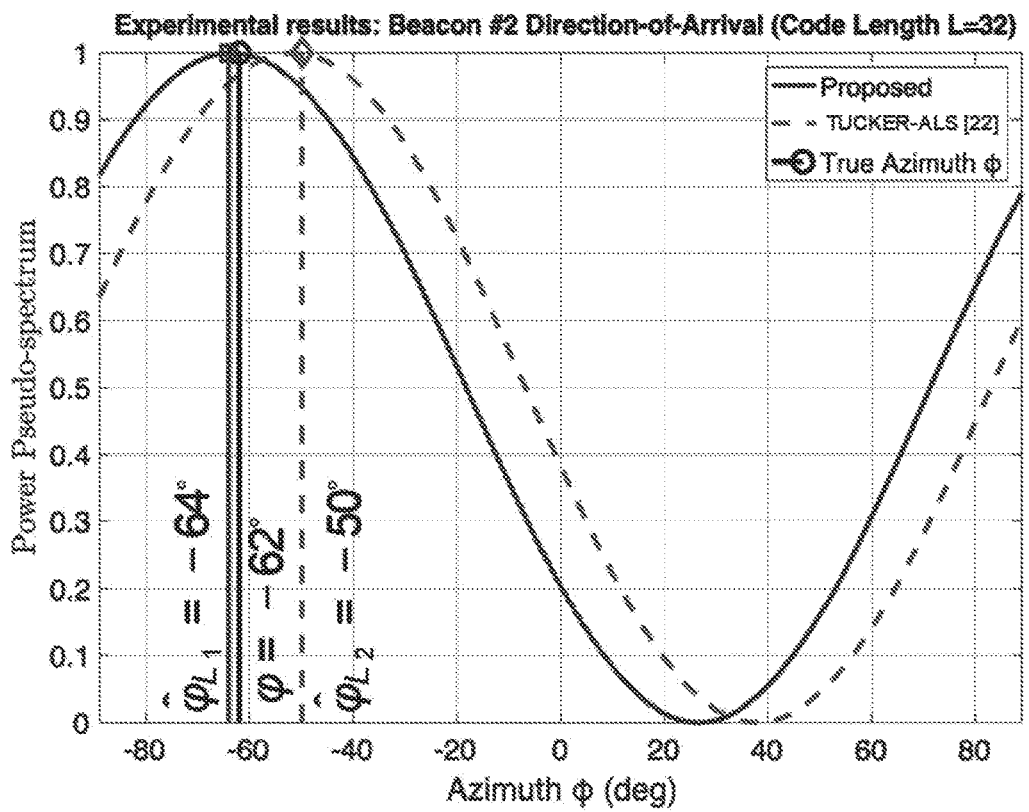
FIG. 18 illustrates exemplary power pseudo-spectra of the azimuth elevation angle-of-arrival of second acoustic beacon using a longer code sequence length than for FIG. 16.

FIG. 18 illustrates exemplary power pseudo-spectra of the azimuth elevation angle-of-arrival of beacon 12 acoustic speaker 32 (using code sequence of length L=32) that is deployed in a water tank 34 after L1-norm and L2-norm Tucker-ALS tensor decomposition of the received data at the multi-element array receiver 18. The exemplary method estimates the azimuth angle-of-arrival for acoustic speaker 32 at −64 degrees, while state-of-the-art L2-norm Tucker-ALS estimates the azimuth angle-of-arrival for acoustic speaker 32 at −50 degrees. The true azimuth angle-of-arrival for acoustic speaker 32 is 62 degrees.

Figure 19:
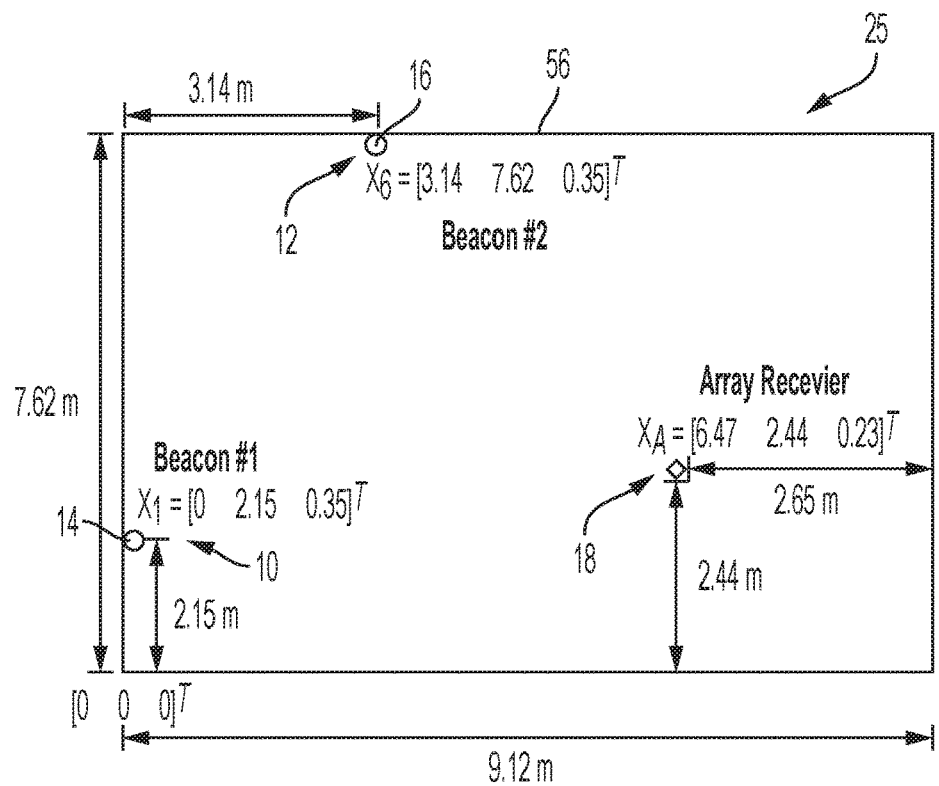
FIG. 19 illustrates an exemplary deployment of a hydrophone array and acoustic non-coded beacons.

FIG. 19 illustrates exemplary localization system 25 with the multi-element array receiver 18 being a seven-element hydrophone linear array receiver and two single-element non-coded beacon transmitters 14, 16 in a water tank 56 similar to water tank 34. The hydrophone elements of the array receiver 18 are not limited to a particular arrangement, and may be arranged differently than the pyramidal form previously discussed in relation to the examples of FIGS. 1 and 13. In this example, the length of the code sequence employed by both beacons is L=1. For clarity it should be noted that exemplary systems depicted in FIGS. 1 and 13 estimate the position of the array receiver by estimating the angle-of-arrival of each beacon. The exemplary system depicted in FIG. 19 estimates the positions of the beacons

Figure 20:
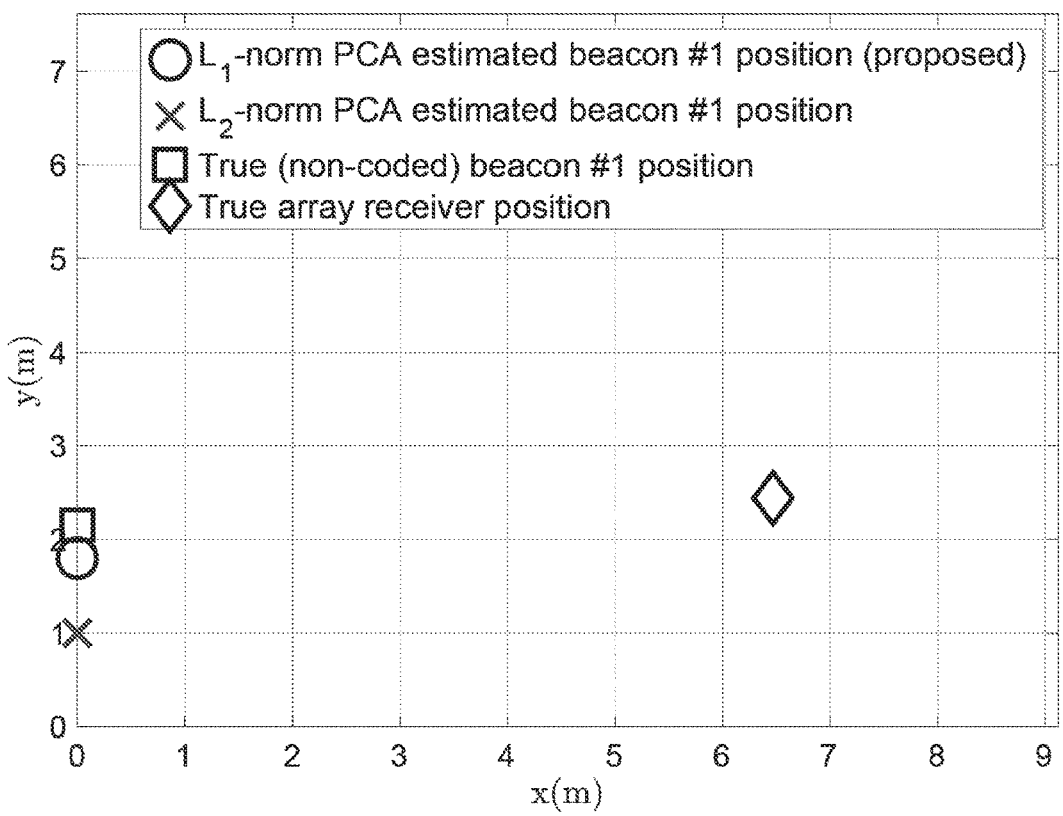
FIG. 20 illustrates exemplary true and estimated positions of a first beacon after $L_1$-norm and $L_2$-norm principal component analysis of received data.
Figure 21:
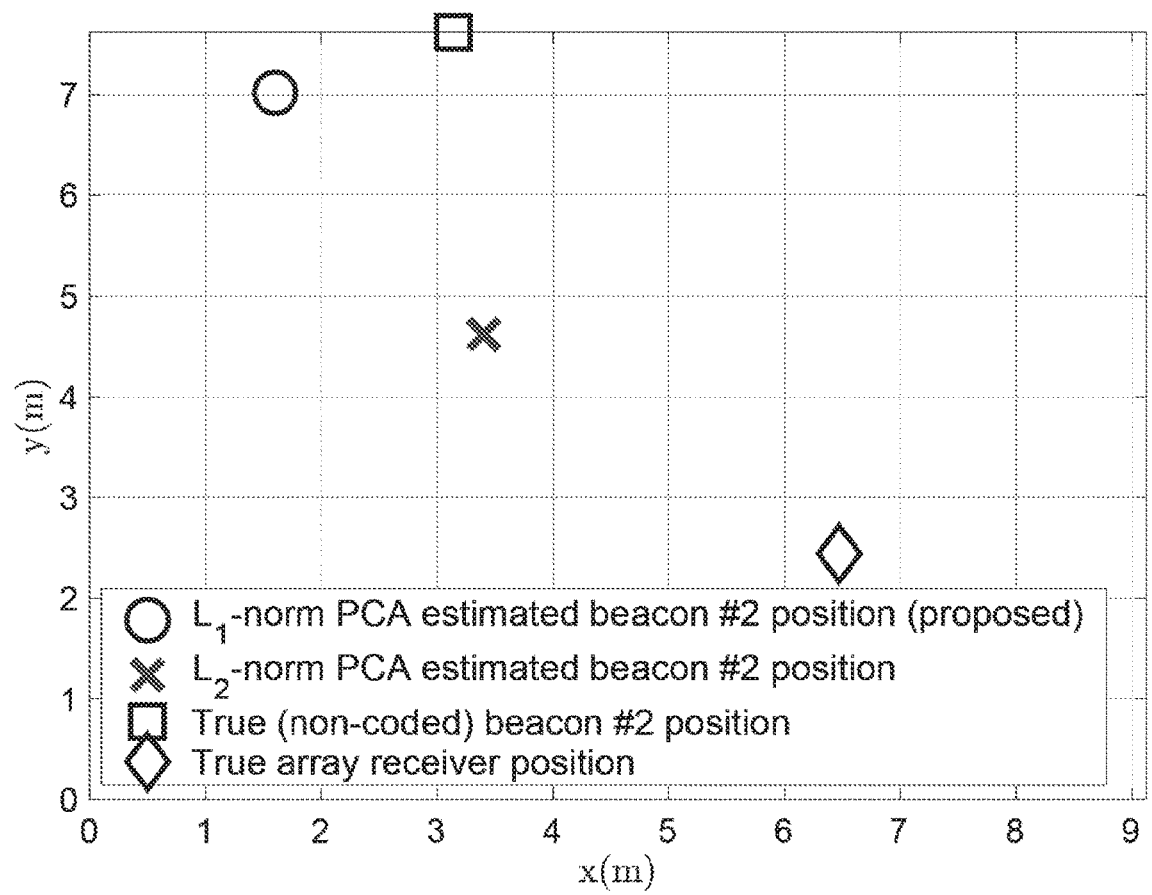
FIG. 21 illustrates exemplary true and estimated positions of a second beacon after $L_1$-norm and $L_2$-norm principal component analysis of received data.

10, 12 assuming that the position of the array receiver 18 is known. FIG. 20 illustrates exemplary true and estimated positions of first beacon 10 transmitter 14 after L1-norm and L2-norm principal component analysis of the received data. FIG. 21 illustrates exemplary true and estimated positions of second beacon 12 transmitter 16 after L1-norm and L2-norm principal component analysis of the received data.

The example in FIG. 19 assumes that the three-dimensional positions of the linear array receiver 18 and the three-dimensional positions of the two beacons 10, 12 are known, as their (x,y,z) positions are shown. FIG. 20 and FIG. 21 shows that we can collect N snapshots of non-coded (L=1) data over time from both beacons 10, 12 at the linear array receiver 18 of D elements (e.g. D=7), arrange them in matrix form (with D rows and N columns) and estimate the two-dimensional (x,y) position of the beacons in the tank after estimating their respective azimuth angle-of-arrival at the array receiver. FIG. 20 shows that $L_1$-norm principal component analysis of the received data results in far more accurate estimation of the position of beacon 10. In other words, the error between the estimated position and the true position of beacon 10 is smaller than employing traditional state-of-the-art $L_2$-norm principal component analysis of the data. FIG. 21 shows that $L_1$-norm principal component analysis of the received data results in far more accurate estimation of the position of beacon 12, as the error between the estimated position and the true position of beacon 12 is smaller than employing traditional state-of-the-art $L_2$-norm principal component analysis of the data. An objective of this example is to quantify the position estimation error of the exemplary method. For this proof-of-concept example, the geometry of the receiver array 18 allows an estimation of the two-dimensional (x,y) positions of the beacons 10, 12. It is understood that the exemplary method can be applied to different array geometries that allow the estimation of the three-dimensional (x,y,z) positions of the beacons.

In examples, a computer system may be included and/or operated within which a set of instructions, for causing the machine (e.g., cytometer, smartphone) to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. While the machine is discussed in the examples as a smartphone and cytometer, it is understood that the machine may be a personal computer (PC), a tablet PC, a set-top box (STB), a personal digital assistant (PDA), a cellular telephone, a web appliance, a server, a network router, switch or bridge, or any machine capable of executing the computer application or another other set of instructions (sequential or otherwise) that specify actions to be taken by that machine. Further, the term "machine" shall also be taken to include any collection of machines that individually or jointly execute a set (or multiple sets) of instructions to perform any one or more of the methodologies discussed herein.

The exemplary machine may include a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device (e.g., GUI). Computer system also may include a video display unit (e.g., a liquid crystal display (LCD) or a cathode ray tube (CRT)), an alphanumeric input device (e.g., keyboard, keypad), a cursor control device (e.g., mouse. touchpad), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The instructions may include, for example, computer-executable instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A direction-of-arrival estimation method of an object submerged underwater, comprising:
   collecting data snapshots over time at an acoustic array receiver attached to the object underwater from beacon signals transmitted from two known location beacons;
   organizing the collected data snapshots in a tensor data structure; conducting joint space-time signal processing; and
   estimating azimuth and elevation angles-of-arrival of the transmitted beacon signals via Doppler-, multipath-, and impulsive noise-resistant tensor subspaces.

2. The method of claim 1, the estimating step including principal-component analysis (PCA) for finding the $L_2$-norm space-time principal vector tensor subspace of the organized data snapshots.

3. The method of claim 1, the estimating step including the acoustic array receiver determining iteratively refined $L_2$-norm (absolute error) space-time tensor subspaces.

4. The method of claim 3, the estimating step further including determining a Doppler- and multipath-resistant estimation of the azimuth and elevation angles-of-arrival and codes of the beacon signals.

5. The method of claim 4, wherein length of the code can be digitally tuned at the beacons to control precision and accuracy of the estimation of the angles of arrival.

6. The method of claim 1, wherein the acoustic array receiver is a triangular hydrophone acoustic array receiver.

7. The method of claim 6, wherein the beacon signals are jointly space-time filtered at the triangular hydrophone acoustic array receiver.

8. The method of claim 1, wherein the object is an autonomous underwater vehicle.

9. The method of claim 1, wherein the beacons are single-hydrophone acoustic nodes that are deployed in known locations and transmit time-domain coded signals in a spread-spectrum fashion.

10. The method of claim 1, wherein the beacons and the acoustic array receiver are fully programmable modems.

11. A location system for direction-of-arrival estimation of an object submerged underwater, with the object having sensor data and measurements from two locations, comprising an acoustic array receiver attached to the object underwater and configured for collecting sound wave data snapshots over time from beacon signals transmitted from two known location beacons, and a processor in communication with the acoustic array receiver, the processor configured to organize the collected sound wave data snapshots in a tensor data structure, conduct joint space-time signal processing, and estimate azimuth and elevation angles-of-arrival of the transmitted beacon signals via Doppler-, multipath-, and impulsive noise-resistant tensor subspaces.

12. The system of claim 11, the processor estimate including principal-component analysis (PCA) for finding the $L_2$-norm space-time principal vector tensor subspace of the organized data snapshots.

13. The system of claim 11, the processor estimate including the acoustic array receiver determining iteratively refined $L_2$-norm (absolute error) space-time tensor subspaces.

14. The system of claim 13, the processor determining a Doppler- and multipath-resistant estimation of the azimuth and elevation angles-of-arrival and codes of the beacon signals.

15. The system of claim 14, further comprising the two known location beacons, each beacon configured to digitally tune its beacon signal code to control precision and accuracy of the estimation of the angles of arrival.

16. The system of claim 11, wherein the acoustic array receiver is a triangular hydrophone acoustic array receiver.

17. The system of claim 16, wherein the beacon signals are jointly space-time filtered at the triangular hydrophone acoustic array receiver.

18. The system of claim 11, wherein the object is an autonomous underwater vehicle.

19. The system of claim 11, further comprising the two known location beacons, each beacon including a single-hydrophone acoustic node that transmits time-domain coded signals in a spread-spectrum fashion.

20. A location estimation method of a first beacon, comprising:

collecting data snapshots over time at an acoustic array receiver attached to an object underwater from beacon signals transmitted from the first beacon and a second beacon;

organizing the collected data snapshots in matrix form having rows and columns; conducting joint space-time signal processing;

estimating azimuth angles-of-arrival of the transmitted beacon signals via Doppler-, multipath-, and impulsive noise-resistant tensor subspaces; and estimating the location of the first beacon based on the estimated azimuth angle-of-arrival of the transmitted beacon signals.

* * * * *